(12) United States Patent
Abouelseoud et al.

(10) Patent No.: US 10,382,983 B2
(45) Date of Patent: Aug. 13, 2019

(54) DIRECTIONAL BEACON TRANSMISSION AND RECEPTION ACTIVITY INDICATION

(71) Applicant: SONY CORPORATION, Tokyo (JP)

(72) Inventors: Mohamed Abouelseoud, San Francisco, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/921,397

(22) Filed: Mar. 14, 2018

(65) Prior Publication Data

US 2019/0182685 A1 Jun. 13, 2019

Related U.S. Application Data

(60) Provisional application No. 62/597,484, filed on Dec. 12, 2017.

(51) Int. Cl.
*H04W 24/02* (2009.01)
*H04B 17/30* (2015.01)
*H04W 40/16* (2009.01)

(52) U.S. Cl.
CPC ........... *H04W 24/02* (2013.01); *H04B 17/30* (2015.01); *H04W 40/16* (2013.01)

(58) Field of Classification Search
CPC ....... H04W 24/02; H04W 40/16; H04B 17/30
USPC ................................. 455/63.4, 67.7
See application file for complete search history.

(56) References Cited

U.S. PATENT DOCUMENTS

| 8,861,483 B2 | 10/2014 | Shim et al. |
| 9,107,229 B2 | 8/2015 | Choudhury et al. |
| 2014/0153415 A1* | 6/2014 | Choudhury ....... H04W 72/0446 370/252 |

(Continued)

FOREIGN PATENT DOCUMENTS

| RU | 2 475 398 C1 | 2/2013 |
| WO | 2008/033805 A2 | 3/2008 |
| WO | 2009/149533 A1 | 12/2009 |

OTHER PUBLICATIONS

ISA/RU, Federal Institute of Industrial Property, International Search Report and Written Opinion dated Mar. 7, 2019, related PCT international application No. PCT/US2018/064872, pp. 1-7, claims searched, pp. 8-12.

*Primary Examiner* — Ayodeji O Ayotunde
(74) *Attorney, Agent, or Firm* — O'Banion & Ritchey LLP; John P. O'Banion

(57) ABSTRACT

Wireless directional communication is performed in the millimeter wave (mmW) band by nodes in a wireless mesh network. Beacon frames are configured to incorporate an activity indicator that signals active and inactive communication directions on the mmW, with a flag for each respective direction of communication (transmit or receive). The activity indicator is utilized to enhance route and beam selection so as to obtain connections subject to less interference, and/or that create less interference to other stations. The activity indicator is also, or alternately, utilized for improving selections of a connection to an access point (AP) or station (STA) or mesh station (MSTA), toward reducing interference, or selecting which beam from a given AP, STA, or MSTA is to be utilized. Distributed interference and resource coordination can be initiated, and/or rerouting determined, based on the activity indicator.

20 Claims, 19 Drawing Sheets

(56) References Cited

U.S. PATENT DOCUMENTS

| | | | | |
|---|---|---|---|---|
| 2015/0180561 A1* | 6/2015 | Jindal | ............... | H04L 25/03898 375/267 |
| 2015/0312850 A1 | 10/2015 | Li et al. | | |
| 2016/0255660 A1* | 9/2016 | Son | ...................... | H04B 7/0491 370/329 |
| 2017/0041830 A1* | 2/2017 | Davis | ................ | H04W 36/0005 |

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| Octets: 2 | 2 | 6 | 6 | 3 | 3 | 4 |

FIG. 7
(Prior Art)

| Direction | CDOWN | Sector ID | DMG Antenna ID | RXSS Length |
|---|---|---|---|---|
| B0 | B1 – B9 | B10 – B15 | B16 – B17 | B18 – B23 |
| Bits: 1 | 9 | 6 | 2 | 6 |

FIG. 8
(Prior Art)

| Total sectors in ISS | Number of RX DMG antennas | Reserved | Poll Required | Reserved |
|---|---|---|---|---|
| B0 – B8 | B9 – B10 | B11 – B15 | B16 | B17 – B23 |
| Bits: 9 | 2 | 5 | 1 | 7 |

FIG. 9A
(Prior Art)

| Sector select | DMG Antenna select | SNR report | Poll Required | Reserved |
|---|---|---|---|---|
| B0 – B5 | B6 – B7 | B8 – B15 | B16 | B17 – B23 |
| Bits: 6 | 2 | 8 | 1 | 7 |

FIG. 9B
(Prior Art)

DIRECTIONAL BEACON TRANSMISSION AND RECEPTION ACTIVITY INDICATION

CROSS-REFERENCE TO RELATED APPLICATIONS

This application claims priority to, and the benefit of, U.S. provisional patent application Ser. No. 62/597,484 filed on Dec. 12, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to communicating an activity indicator for each communication direction so that interference can be reduced in the network.

2. Background Discussion

Due to the need of higher traffic capacity wireless networks in the millimeter wavelength (mm-wave or mmW) regime are becoming increasingly important. Toward meeting this need for higher traffic capacity, network operators have begun to embrace the idea of densification. Current sub-6 GHz wireless technology is not sufficient to cope with the high demand for data. One easy alternative is utilizing more spectrum in the 30-300 GHz band which is referred to as the millimeter wave band (mmW).

Enabling mmW wireless systems in general requires properly dealing with the channel impairments and propagation characteristics of the high frequency bands. High free-space path loss, high penetration, reflection and diffraction losses reduce the available diversity and limit non-line-of-sight (NLOS) communications.

The small wavelength of mmW enables the use of high-gain electronically steerable directional antennas of practical dimensions. This technology can provide enough array gain to overcome path loss and ensure high Signal-to-Noise Ratio (SNR) at the receiver. Using directional mesh networks in dense deployment environments and the mmW band provides an efficient way to achieve reliable communication between nodes and overcome line-of-sight channel restrictions.

A new communication node (station) starting up in an area will be searching for neighboring nodes to discover and a network to join. The process of initial access of a node to a network comprises scanning for neighboring nodes and discovering all active local nodes. This can be performed either through the new node searching for a specific network/list of networks to join or the new node sends a broadcast request to join any already established network that will accept the new node.

A node connecting to a mesh network needs to discover all neighboring nodes to decide on the best way to reach a gateway/portal mesh node and the capabilities of each of these neighboring nodes. The new node examines every channel for possible neighboring nodes for a specific period of time. If no active node is detected after that specific time, the node moves to the next channel.

When a node is detected, the new node needs to collect sufficient available information to configure itself (its PHY layer) for operation in the regulatory domain. This task is further challenging in mmWave communications due to directional transmissions. The challenges in this process can be summarized as: (a) obtaining a knowledge of surrounding node's IDs; (b) obtaining a knowledge of best transmission pattern for beamforming; (c) keeping the whole network in synchronization over an extended period of time; (d) overcoming channel access issues which arise due to collisions and deafness; and (e) channel impairments due to blockage and reflections.

Thus, improved neighborhood discovery methods are sought to overcome some or all of the above issues to enable pervasiveness of mmWave device-to-device (D2D) and mesh technologies. However, existing technologies for mesh networking address mesh discovery solutions for networks operating in broadcast mode but are largely not targeted to networks having directional wireless communications.

Accordingly, a need exists for enhanced synchronization and beamforming mechanisms within wireless communication networks. The present disclosure fulfills that need and provides additional benefits over previous technologies.

BRIEF SUMMARY

A wireless communication circuit (station, node) with associated programming configured for wirelessly communicating with other wireless communication stations (nodes) comprising directional millimeter-wave (mmW) communications having a plurality of antenna pattern sectors each having different transmission directions. Various forms of beacon frames are transmitted which incorporate an activity indicator that signals communication directions which have active data transmissions. In at least one embodiment these activity indicators comprise a flag (or field) for each respective direction of communication, to indicate whether that direction is subject to active transmission or reception.

The stations utilize the activity indicator for making improved selections of prospective connections so as to obtain connections that are subject to less interference, and/or that create less interference to other stations. The activity indicator can also, or alternatively, be utilized when selecting a communication connection to an access point (AP) or station (STA) or mesh station (MSTA), toward obtaining less interference in the network. The activity indicator can also, or alternatively, be utilized when selecting a communication beam from a given access point (AP) or station (STA) or mesh station (MSTA), toward obtaining less interference in the network. In addition, the activity indicator can also, or alternatively, be utilized as a basis for performing a distributed interference and resource coordination by exchanging messages in a direction of potential high interference to optimize overall communications and create less interference between nodes in the mesh network. Still further, the activity indicator can be utilized as a basis for rerouting data through other nodes or communication beams whenever alternative communication routes exist which are less spectrally congested or that are subject to less interference.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-omni directional antenna pattern. Beamforming is used at a transmitter to improve received signal power or signal-to-noise ratio (SNR) at an intended receiver.

BI: The Beacon Interval is a cyclic super frame period that represents the time between beacon transmission times.

BRP: BF refinement protocol; A BF protocol that enables receiver training and iteratively trains the transmitter and receiver sides to achieve the best possible directional communications.

BSS: Basic Service Set; a set of stations (STAs) that have successfully synchronized with an AP in the network.

BSSID: Basic Service Set Identification.

BHI: Beacon Header Interval which contains a beacon transmission interval (BTI) and association-beamforming training period (A-BFT).

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

D2D: device-to-device communication that is a direct communication between two wireless nodes without the need to traverse an access point.

DTI: Data Transfer Interval; the period whereby full BF training is permitted followed by actual data transfer. The DTI can include one or more service periods (SPs) and contention-based access periods (CBAPs).

MAC address: a Medium Access Control (MAC) address.

MBSS: Mesh Basic Service Set; a basic service set (BSS) that forms a self-contained network of Mesh Stations (MSTAs), and which may be used as a distribution system (DS).

MCS: Modulation and coding scheme; an index that can be translated into the PHY layer data rate.

MSTA: Mesh station (MSTA); is a station (STA) that implements the Mesh facility. An MSTA that operates in the Mesh BSS may provide the distribution services for other MSTAs.

Omni-directional: a non-directional antenna mode of transmission.

Quasi-Omni directional: a directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; the SP that is scheduled by the access point (AP). Scheduled SPs start at fixed intervals of time.

Spectral efficiency: the information rate that can be transmitted over a given bandwidth in a specific communication system, usually expressed in bits/sec/Hz.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a mesh configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

DETAILED DESCRIPTION

1. Existing Directional Wireless Network Technology 1.1. WLAN Systems

In WLAN systems, 802.11 defines two modes of scanning; passive and active scanning. The following are the characteristics of passive scanning. (a) A new station (STA), attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) STA moves to a channel, waits for incoming frames or a probe delay timer to expire. (a)(2) If no frame is detected after the timer expires, the channel is considered to be not in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (more rapid) for STAs to gain access to the network compared to the use of passive scanning, since STAs do not need to wait for beacons. (f) In infrastructure basic service set (BSS) and IBSS, at least one STA is awake to receive and respond to probes. (g) STAs in mesh basic service set (MBSS) might not be awake at any point of time to respond. (h) When radio measurement campaigns are active, nodes might not answer the probe requests. (i) Collision of probe responses can arise. STAs might coordinate the transmission of probe responses by allowing the STA that transmitted the last beacon to transmit the first Probe Response. Other nodes can follow and use back-off times and regular distributed coordination function (DCF) channel access to avoid collision.

Figure 1:
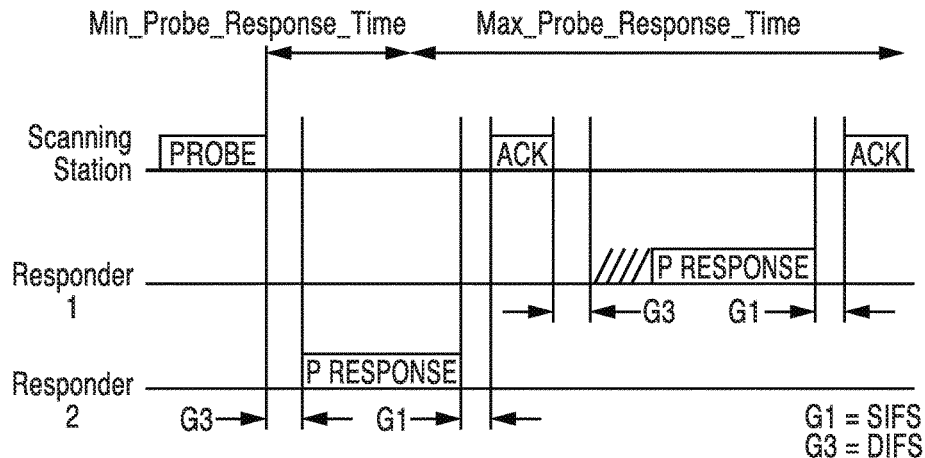
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the minimum and maximum probe response timing. The values G1 is shown set to SIFS which is the interframe spacing prior to transmission of an acknowledgment, while G3 is DIFS which is DCF interframe spacing, represented the time delay for which a sender waits after completing a backoff period before sending an RTS package.

1.2. IEEE 802.11s Mesh WLAN

The IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
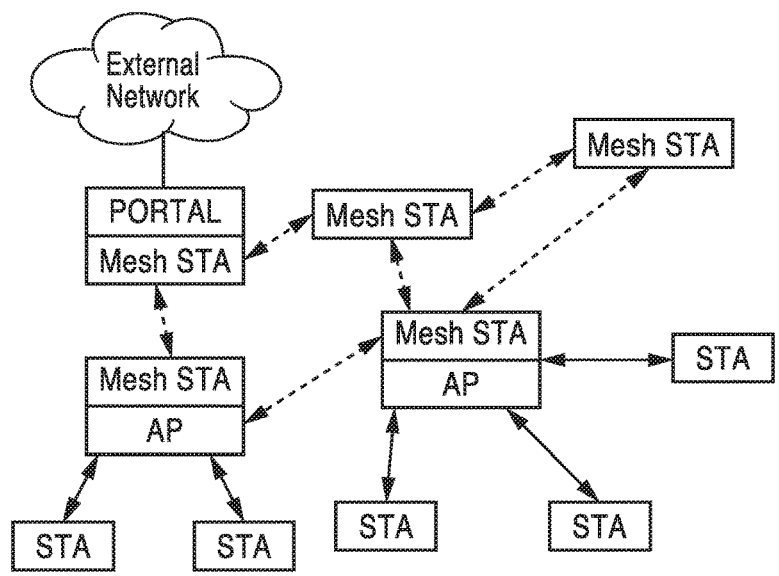
FIG. 2 is a node diagram for a mesh network showing a combination of mesh and non-mesh stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
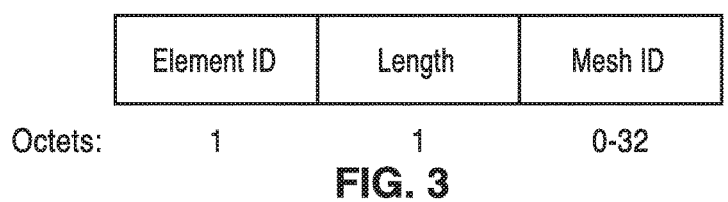
FIG. 3 is a data field diagram depicting a mesh identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example, it is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The standard 802.11a defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmit Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing node (the responder) receives utilizing a quasi-Omni directional pattern. The responder determines the antenna array sector from the initiator which provided the best link quality (e.g., SNR).

Figure 5:
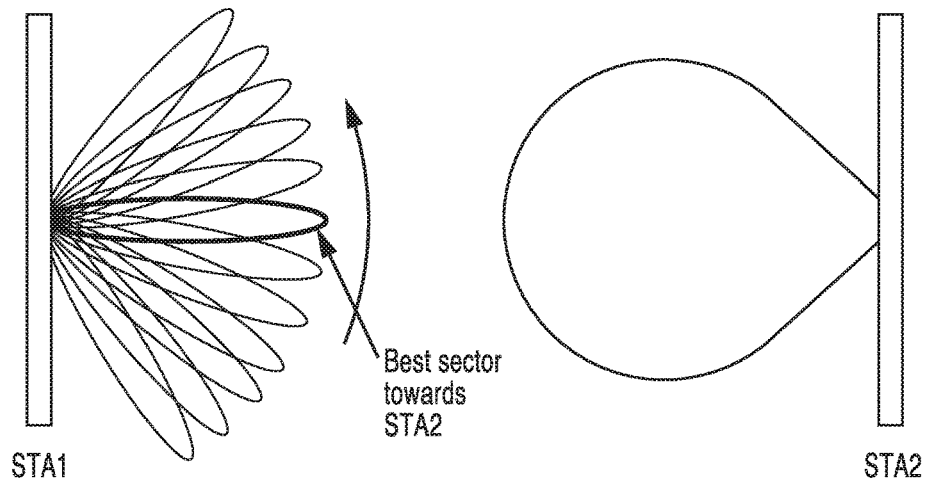
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
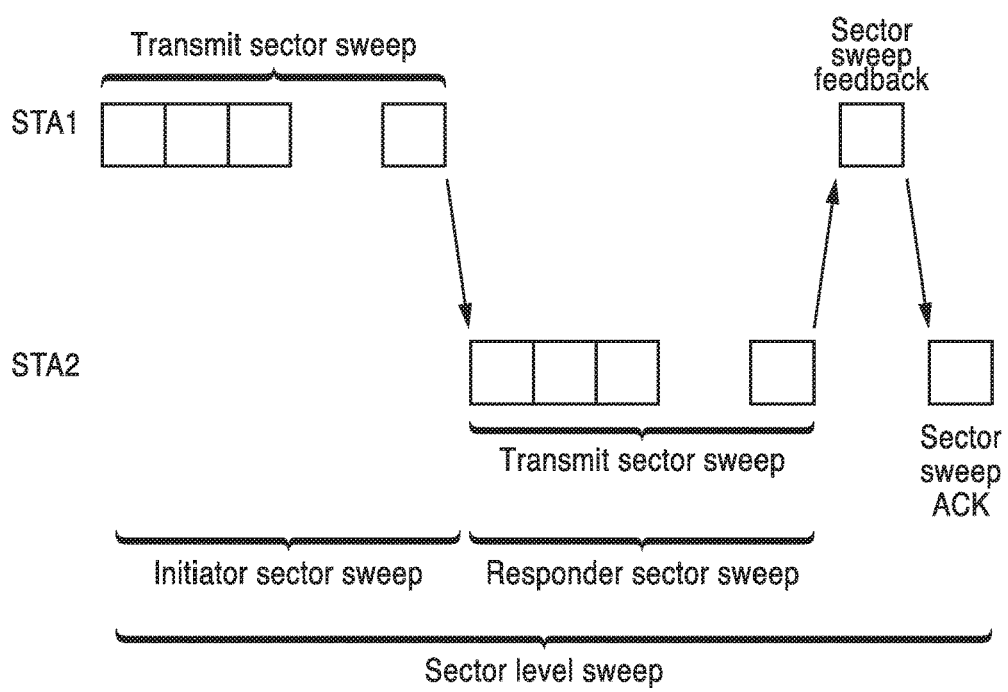
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Introduction to On-Demand Route Synchronization and Beamforming 2.1. Problem Statement Wireless local area network (WLAN) station transmit beacons for network announcement, resource management and synchronization purposes. In millimeter wave (mmwave) communications the transmission of these beacons is directional which provides higher antenna gain toward overcoming path-loss and the near specular channel characteristics. The station nodes can receive multiple usable beams from the same transmitter through line of sight and reflected paths. In addition, nodes might receive multiple beams from multiple transmitters in the area it is scanning. A station node sending or receiving data through a specific directional beam might create interference to the active reception of other stations, or itself suffer from interference from transmission by other stations.

Nodes typically rely on Omni-directional sensing to access the channel, if a listen-before-talk protocol is required. However, using listen before talk does not provide information about spatial channel usage. Knowing the status of ongoing activity in a specific direction can improve node decisions when the node forms new connections, or in avoiding a specific communication direction. It can be an important benefit when the node receives information about usage of this beam direction (e.g., how much this direction is occupied) before making a decision of which directional beam to use or avoid.

In cases where a central controller is not available to manage node connectivity and interference, a distributed system is needed to manage node connectivity and avoid directional interference.

2.2. Contribution of the Present Disclosure

A method and apparatus is described for signaling and receiving information between nodes in the same network, or across different networks, regarding the spatial occupancy of each transmission direction. Nodes can transmit information to other neighboring nodes that indicate which spectral direction is occupied with transmissions and which directions are occupied with reception. In the present disclosure, nodes utilize this information to route their data, to form connections with other nodes, to avoid spectrally congested beams and/or to coordinate their transmissions with one another.

3. Embodiments of Present Disclosure 3.1. Topology Under Consideration

Figure 10:
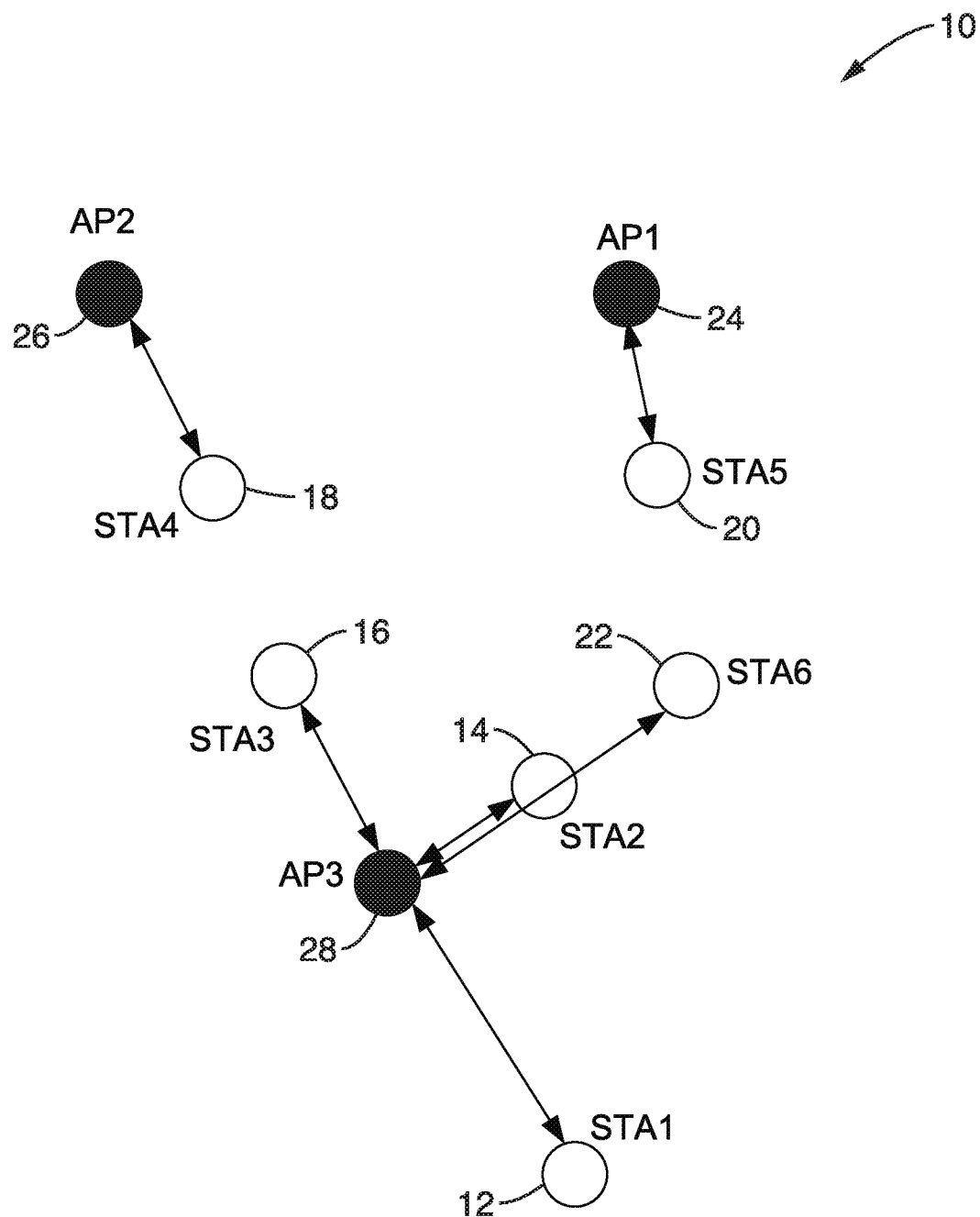
FIG. 10 is a wireless node topology example of wireless mmWave nodes forming a connection based on beacon reception power according to an embodiment of the present disclosure.

FIG. 10 illustrates and example embodiment 10 of multiple BSSs having multiple access points (APs) serving multiple stations (STAs). The stations scan for beacons in the surrounding area and attempt to establish connection to the one found to have the highest received power. This usually represents the station which is closest in distance, or the station with the shortest line of sight to that receiving station. In the figure, stations are seen as STA1 12, STA2 14, STA3 16, STA4 18, STA5 20, STA6 22, as well as AP1 24, AP2 26, and AP3 28, between which are shown communication paths (TX/RX) by the double headed arrows.

However, these communications could result in serious directional interference or spectrum access problems. Consider for example, how STA2 14 and STA3 16 share the same directional beam from AP3. In addition, it can be seen that STA1 12, STA3 16 and STA4 18 will also experience interference whenever the channel is used by both APs (AP2 26 and AP3 28) in a distributed manner.

Figure 11:
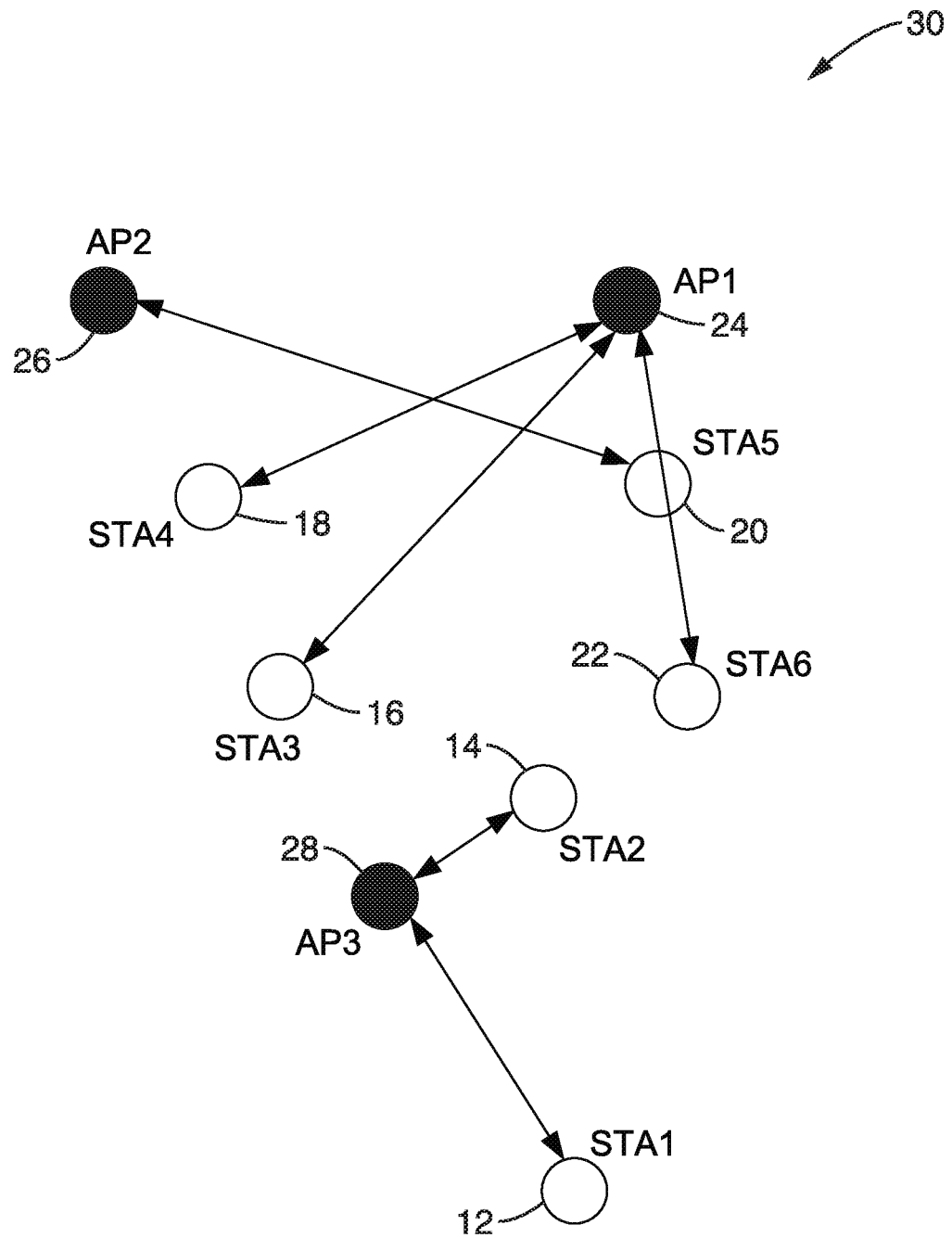
FIG. 11 is a wireless node topology example of wireless mmWave nodes forming a connection based on directional activity according to an embodiment of the present disclosure.

FIG. 11 illustrates an example embodiment 30 configured for avoiding the above interference situations. In this example STA3 16 and STA4 18 avoid using the common direction seen in FIG. 10, and instead establish connection to a further away AP (AP1 24), whereby both of these stations then enjoy an interference free direction of communication. The same situation is shown for STA6 22 and STA 5 20.

In order to achieve the above directional transmission selections in a distributed network setup, the station operating protocols (software, firmware, and/or hardware) of the present disclosure utilize beacons configured for carrying information about directional usage, providing announcements that can aid other network stations toward further coordinating their directional transmission decisions.

3.2. Station Hardware Configuration

Figure 12:
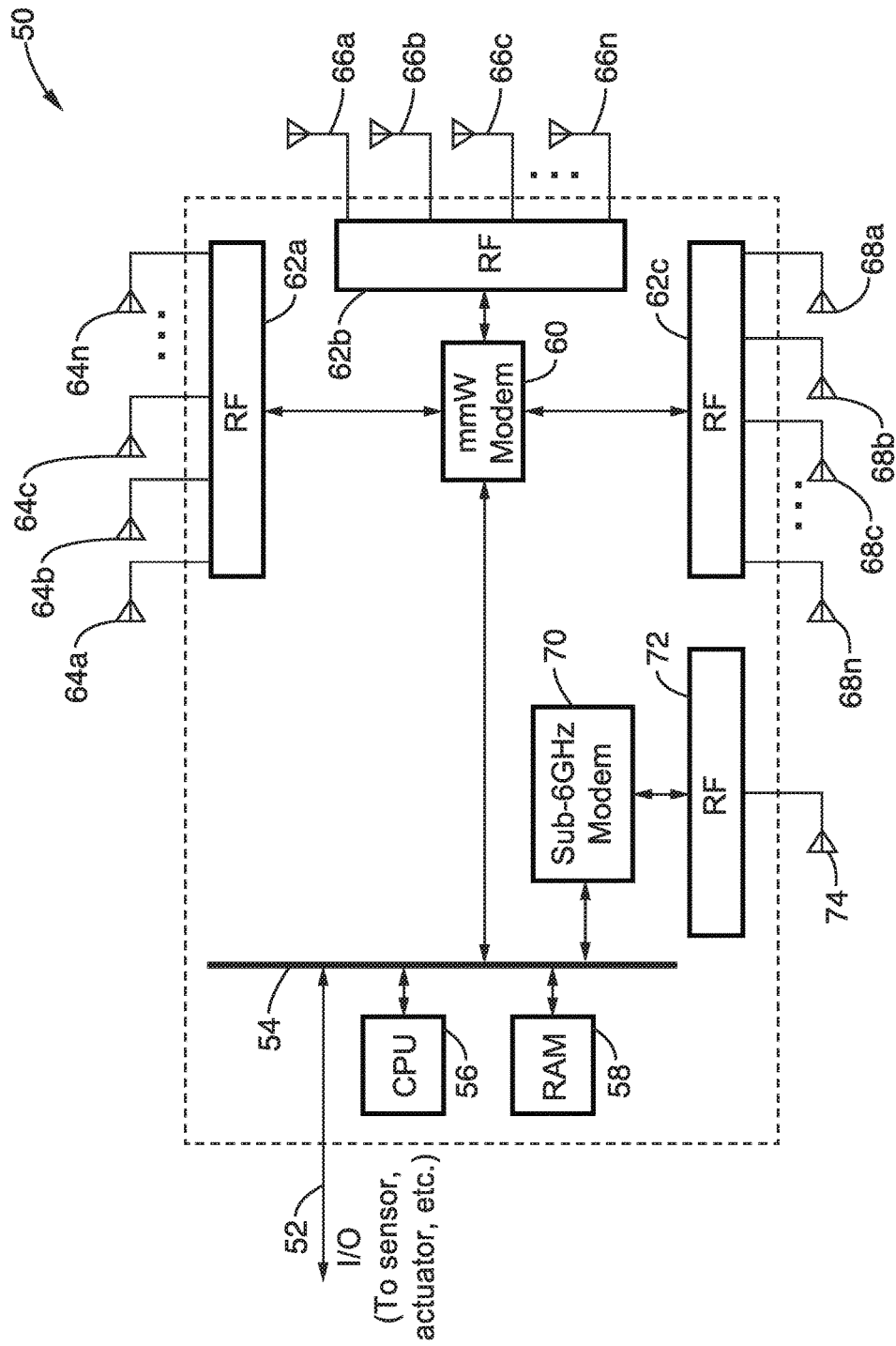
FIG. 12 is a block diagram of station hardware according to an embodiment of the present disclosure.

FIG. 12 illustrates an example embodiment 50 of the hardware configuration for a node (wireless station in the network). In this example a computer processor (CPU) 56 and memory (RAM) 58 are coupled to a bus 54, which is coupled to an I/O path 52 giving the node external I/O, such as to sensors, actuators and so forth. Instructions from memory are executed on processor 56 to execute a program which implements the communication protocols. This host machine is shown configured with a mmW modem 60 coupled to radio-frequency (RF) circuitry 62a, 62b, 62c to a plurality of antennas 64a, 64b, 64c through 64n, 66a, 66b, 66c through 66n, and 68a, 68b, 68c through 68n to transmit and receive frames with neighboring nodes. In addition, the host machine is also seen with a sub-6 GHz modem 70 coupled to radio-frequency (RF) circuitry 72 to antenna(s) 74.

Thus, this host machine is shown in a preferred embodiment as configured with two modems (multi-band) and their associated RF circuitry for providing communication on two different bands. The millimeter wave (mmW) band modem and its associated RF circuitries are configured for transmitting and receiving data in the mmW band. The sub-6 GHz modem and its associated RF circuitry are configured for transmitting and receiving data in the sub-6 GHz band. It should be appreciated that the present disclosure can be implemented in situations which only have the directional transmission at the mmW band and do not provide the sub-6 GHz band.

The two modems and their associated RF circuitry are meant to communicate on two different bands. The mmW band modem and its associated RF circuitries are transmitting and receiving data in the mmW band. The Sub-6 GHz modem and its associated RF circuitry are transmitting and receiving data in the sub-6 GHz band.

Although 3 RF circuitries are shown coupled to the mmW modem in this example, it should be appreciated that an arbitrary number of RF circuits can be coupled to the mmW modem. In general, larger numbers of RF circuitry will result in broader coverage of the antenna beam direction.

Figure 13:
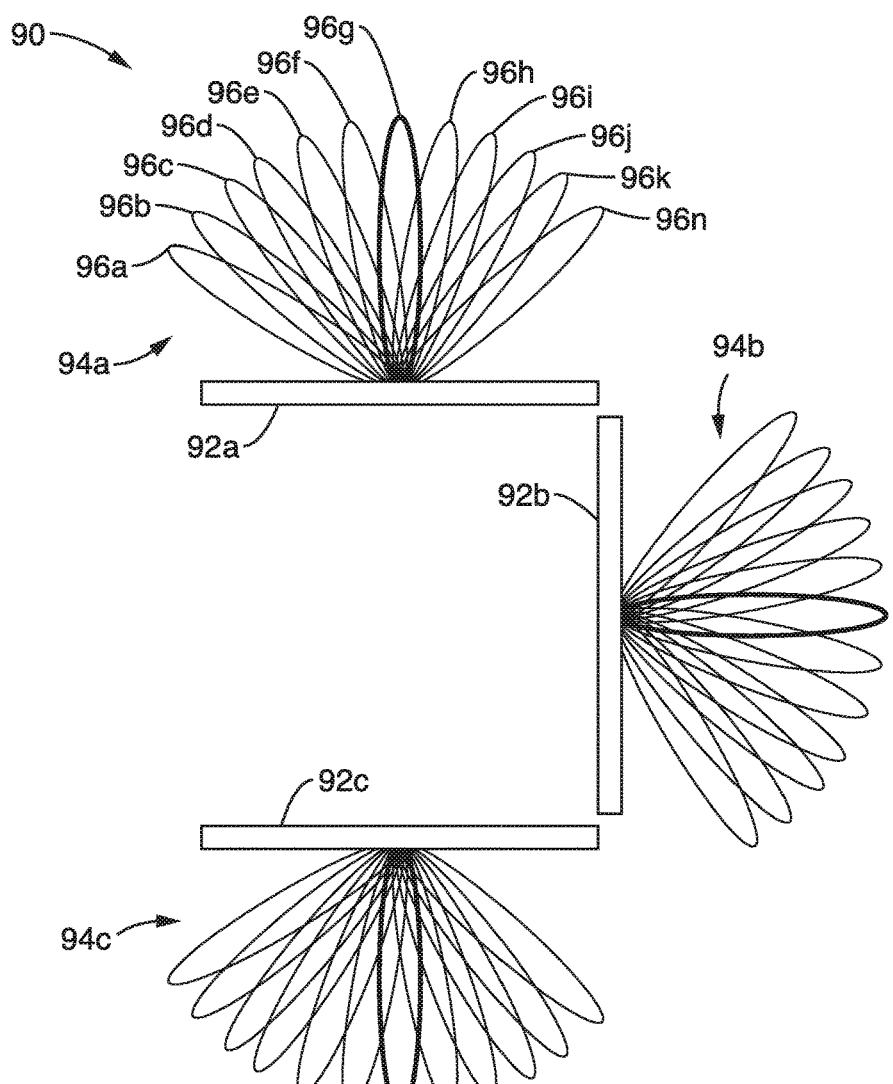
FIG. 13 is a beam pattern diagram generated by a mmW antenna system according to an embodiment of the present disclosure.

FIG. 13 illustrates an example embodiment of mmW beam patterns 90, showing antenna directions which can be utilized by a node to generate thirty-six (36) antenna sector patterns. The node in this example is depicted as implementing three (3) mmW RF circuits and connected antennas, and each mmW RF circuitry and connected antenna generates twelve (12) beamforming patterns, which is termed as the node having thirty-six (36) antenna sectors. But for the sake of simplicity of illustration, the following descriptions will exemplify nodes communicating across a smaller number of antenna sectors. It should be appreciated that any arbitrary beam pattern can be mapped to an antenna sector. Typically, the beam pattern is formed to generate a sharp beam, but it is possible that the beam pattern is generated to transmit or receive signals from multiple angles.

The number of RF circuits and antennas being utilized is typically determined by hardware constraints of a specific device. It should be noted that some of the RF circuits and antennas may be disabled when the node determines it does not need to be utilized for communicating with neighboring nodes.

In at least one embodiment, the mmW RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

Figure 14:
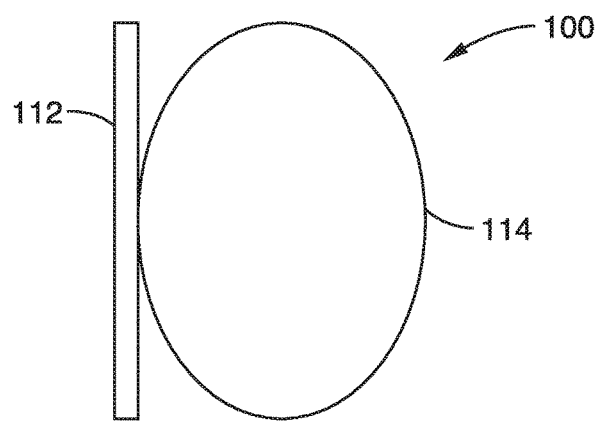
FIG. 14 is a beam pattern diagram generated by a sub 6 GHz antenna according to an embodiment of the present disclosure.

FIG. 14 illustrates an example embodiment 110 of an antenna pattern for the sub-6 GHz modem assumed in this example to use a Quasi-Omni antenna 114 attached to its RF circuitry 112. It should be appreciated that other antenna pattern variations can be utilized without departing from the present teachings.

3.3. Directional Beacon Channel-Usage Aware

Station nodes are configured according to the present disclosure, that when transmitting beacons they keep track of average statistics of its channel usage, transmission, and reception in each beam direction. The time window over which these statistics are collected and maintained can be defined and adjusted according to each use case and application.

Figure 15:
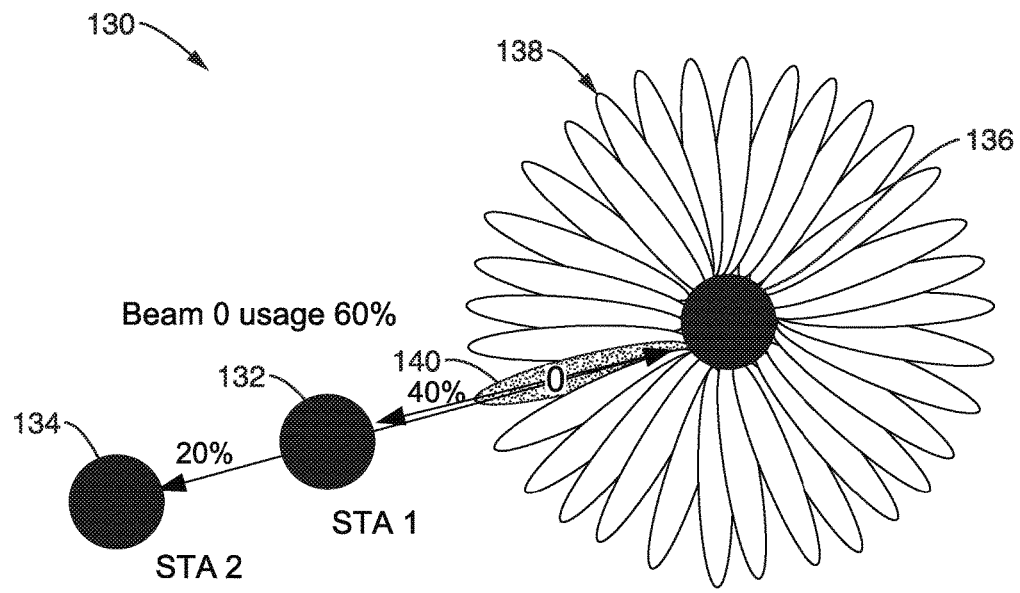
FIG. 15 is a wireless node diagram of directional beam usage for 2 peers served by one beam according to an embodiment of the present disclosure.

FIG. 15 illustrates an example embodiment 130 in which nodes according to the present disclosure maintain directional statistics as per direction and per peer statistic, to allow updating usage information if a peer is turned off or departs from the direction to use another direction. In the figure a STA1 132 and STA2 134 are seen communicating with a node 136 which can transmit beacons 138 in all directions. In this example, one direction (Beam 0) 140 serves both peer nodes (STA1 132 and STA2 134) from which statistics are collected for each peer, STA1 and STA2, and the accumulated statistics are calculated as well. In the figure it is seen that Beam 0 has a 60% utilization with STA1 132 accounting for 40% of utilizing and STA2 134 accounting for the remaining 20% of utilization.

Figure 16:
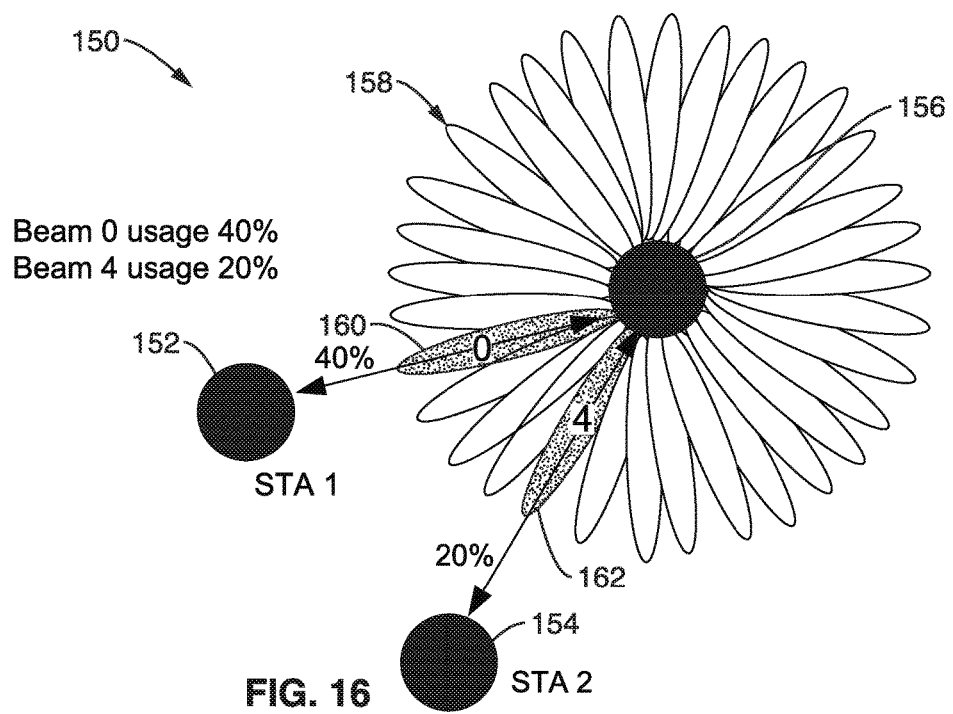
FIG. 16 is a wireless node diagram of directional beam update after one peer moving to a new directional beam according to an embodiment of the present disclosure.

FIG. 16 illustrates an example embodiment 150 of nodes maintaining directional statistics, which is similar to the previous figure. In this example, STA1 152 and STA2 154 are seen communicating with node 156. Node 156 can communicate (mmW) in all directions 158, and is seen communicating with STA1 152 in with Beam 0 in direction 160, and communicating with STA2 154 with Beam 4 in direction 162. In comparison to FIG. 15, FIG. 16 shows that one peer, STA2 154, has been moved to utilize a new direction with the associated serving beam updated to be Beam 4 162. Thus, the statistics for STA2 154 are moved to the new serving beam, Beam 4. Beam 0 usage statistics are updated to reflect STA1 usage only. In the Example, Beam 0 is seen to have 40% usage, while Beam 4 has 20% usage.

Figure 17A:
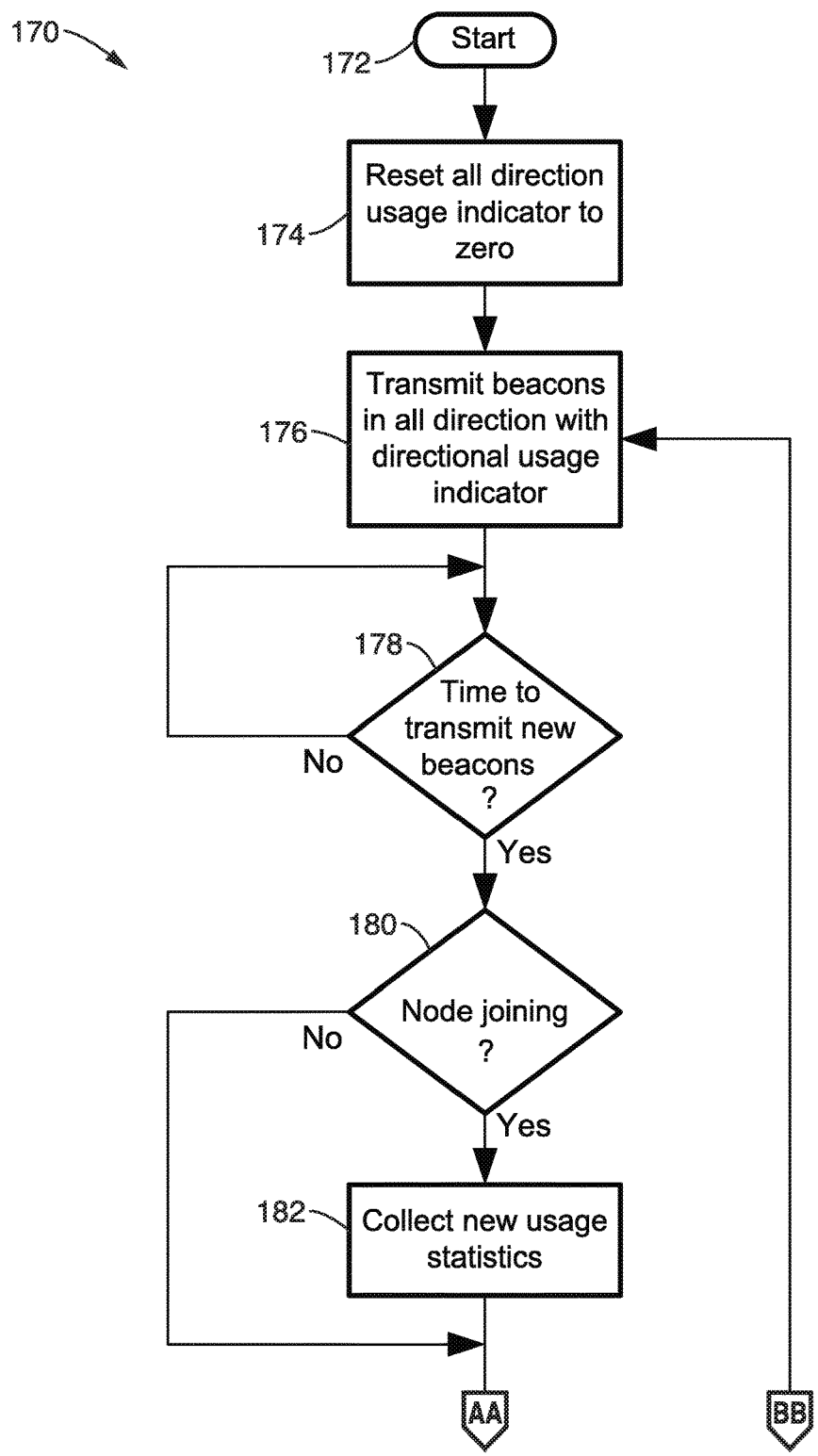
FIG. 17A and FIG. 17B is a flow diagram of beacon transmission with usage-aware indicators according to an embodiment of the present disclosure.
Figure 17B:
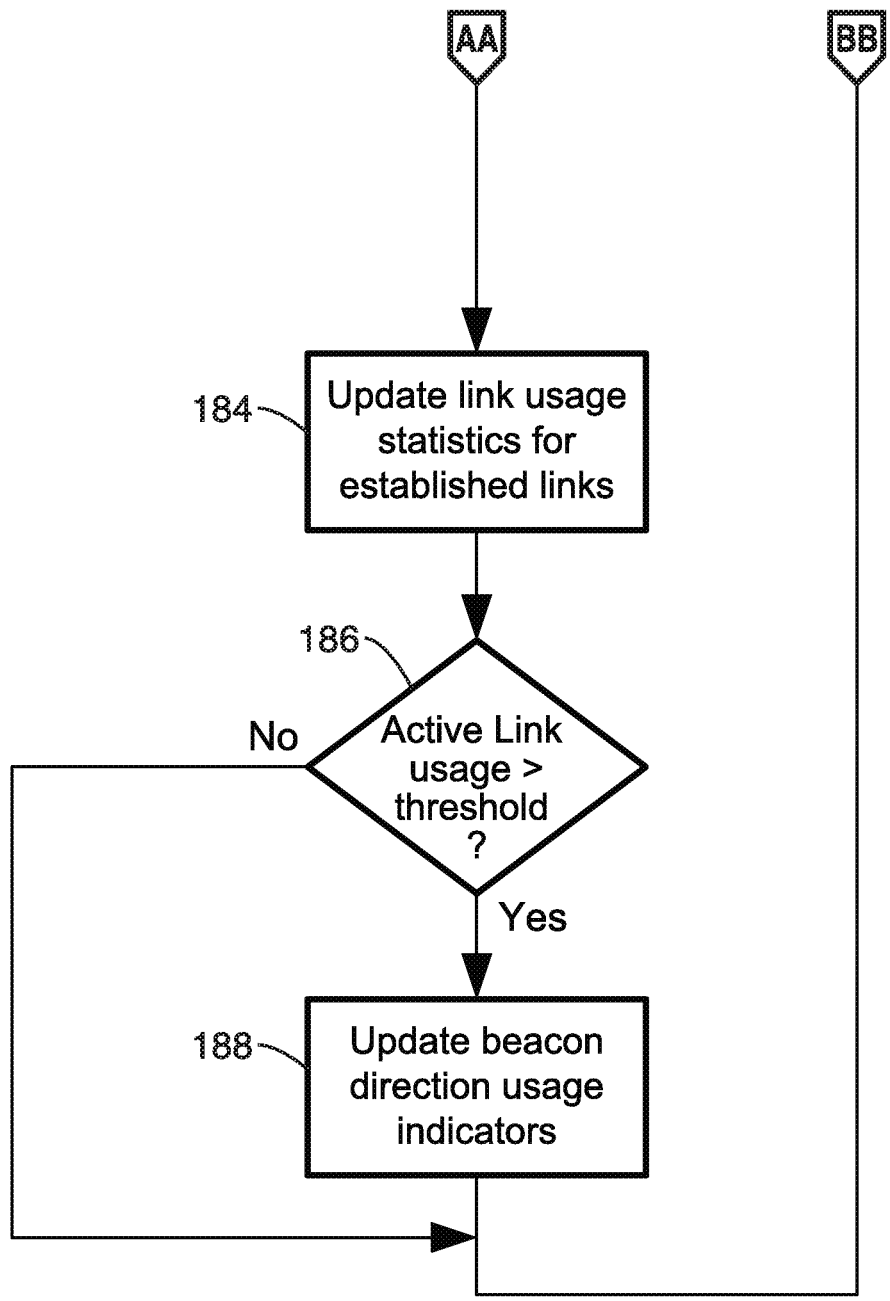

FIG. 17A and FIG. 17B illustrates an example embodiment 170 of beacon transmission with usage-aware indicators. The present disclosure considers that these frames having usage-aware indicators, can be various types of frames, including beacon frames, beamforming frames, SSW frames, BRP frames, and so forth. In FIG. 17A, when a node commences its operation 172, all statistics are preferably reset 174 for already setup links if it has pre-defined links. If the node has no links already setup, then the database for the directional beams is empty. At the appropriate time the node transmits mmW beacons 176 in all directions using directional beams. The beacons are configured to contain an indicator for relaying information about the use of the channel directions or the specific direction of that beam.

A determination 178 is made of when to transmit a new beacon. At the time of the next beacon transmission interval, before beacon transmission, the node checks 180 for new connectivity (any nodes joining). If a new communication connection is established, execution moves to block 182 with new usage statistics collected for this directional transmission. Then in block 184 in FIG. 17B, statistics commence to be collected for link usage for established links. Then in block 186 a check is made as to how active link usage compares to thresholds, such as pre-defined thresholds. If the active link usage exceeds the change threshold, then in block 188 the node sends the beacons with this new usage indicator and returns to block 176 in FIG. 17A.

The node transmitting the beacons can also choose to attach two indications, one for transmission and one for reception, to the transmitted beacon in the direction of the transmission and/or reception. Also in regards transmitting the beacons, the system can also choose to attach the collected statistics about the link usage in the transmission, reception, or both the transmission and reception, to the transmitted beacon in the direction of the transmission and/or reception.

3.3.2. Directional Beacon Channel-Usage Aware Reception

Figure 18A:
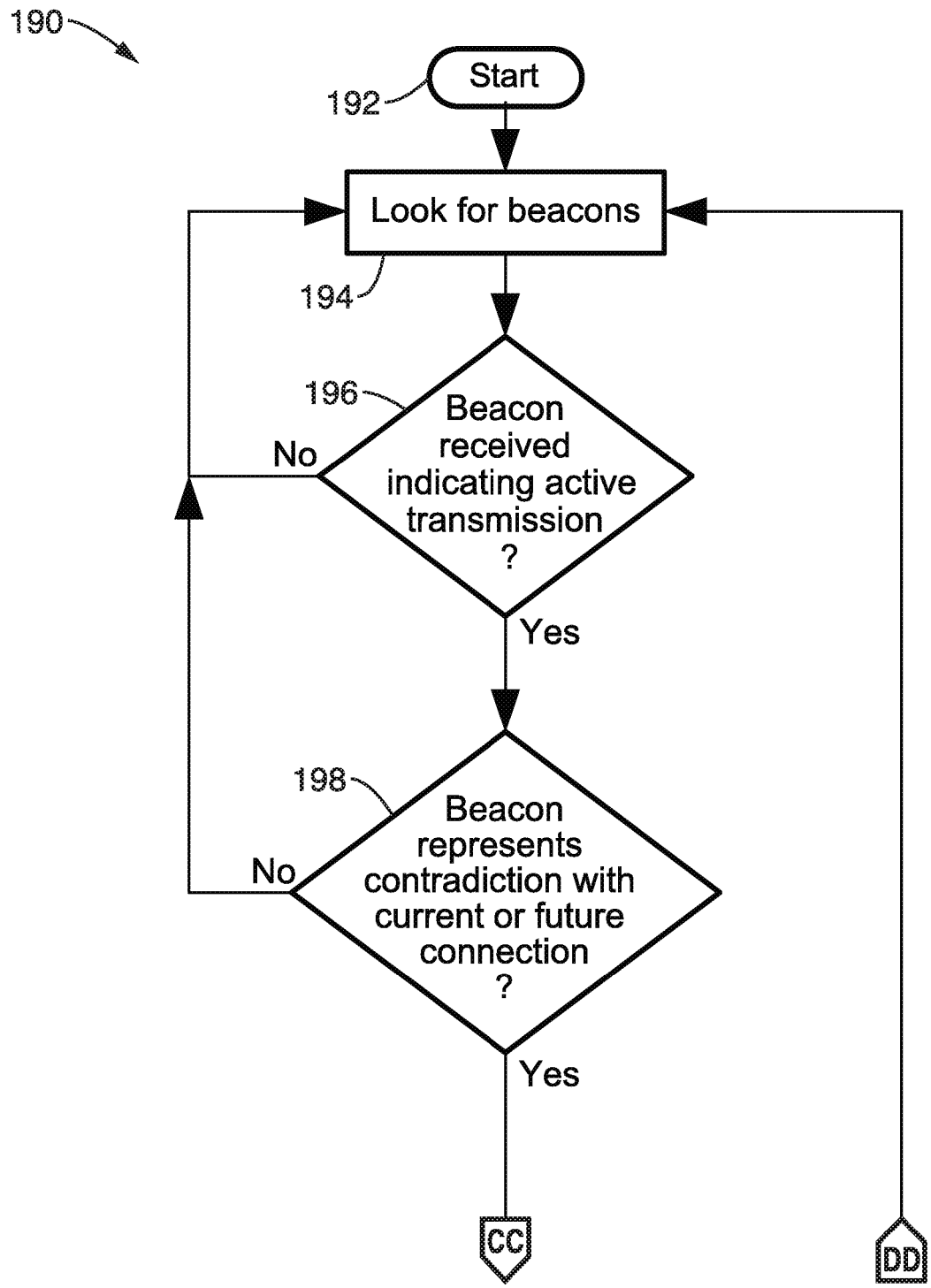
FIG. 18A and FIG. 18B is a flow diagram beacons with usage-aware indicators according to an embodiment of the present disclosure.
Figure 18B:
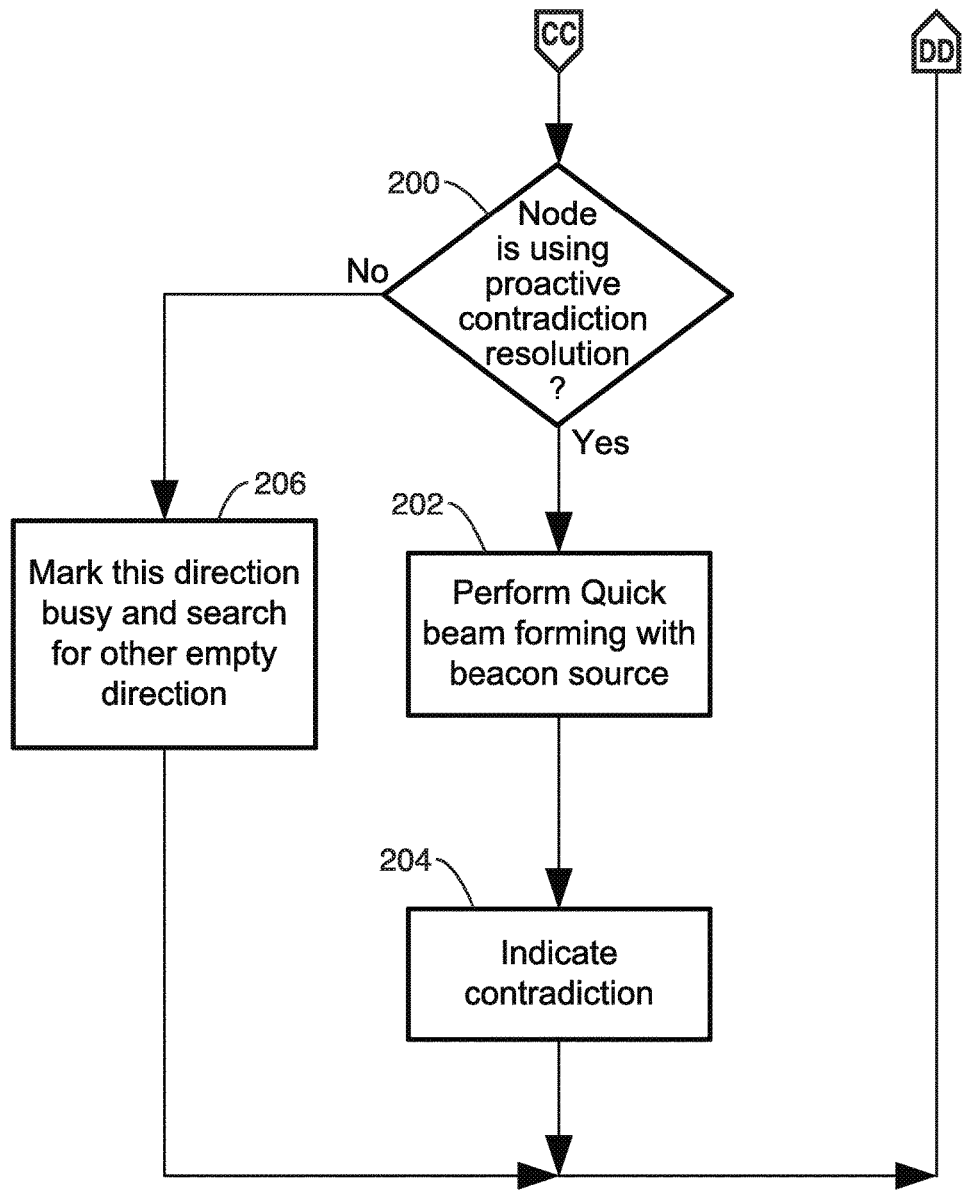

FIG. 18A and FIG. 18B illustrates an example embodiment 190 for utilizing channel usage-aware directional beacons. The process commences 192 in FIG. 18A and nodes listen (look, attempt to detect) 194 for beacons in order to determine channel usage in each direction. A check is made 196 if the received beacon indicates active transmission is taking place. The received beacon should contain an indication of active transmission and/or reception (flag bits). It also can have information about the usage statistics. If it is not active transmission, then a return to block 194 is made, otherwise block 198 is reached which determines whether the information received from the beacon indicates a contradiction exists with a current communication connection or will exist with a future communication connection. Whenever a beacon is received that indicates a contradiction, the node reacts upon the contradiction. The contradiction might represent a concurrent transmission or reception in the same direction where the node is using the channel. This represents a possible interference imposed by the node on other transmissions occurring on the network or a possible interference affecting the node from the other concurrent transmissions in the network where the beacon is detected.

Once a contradiction is detected, a node can decide to take either a proactive or a passive approach to solving this contradiction. When a contradiction is detected, then block 200 is reached in FIG. 18B which checks for proactive versus passive contradiction resolution. If block 200 indicates passive contradiction resolution, then block 206 is reached and the node marks this direction as busy and searches for other directions that are available, for example for which no beacon received in that direction has usage indicator bits set, before returning to searching for beacons at block 194. The node continues scanning until it finds a suitable direction that is not used by other connection.

If it is determined at block 200 that proactive contradiction resolution is to be performed, then block 202 is reached. In proactive contradiction resolution, the node reaches out to the node which is indicating channel activity to request contradiction resolution. This resolution can be in the form of spectral sharing, coordination or acquiring the channel by one of the two transmission. The node continues listening for (attempting to receive) beacons to monitor activity in the channel. Specifically, these resolutions are exemplified at block 202 with performing a quick beam forming with the beacon source and at block 204 by indicating the contradiction, prior to returning to searching for beacons at block 194.

3.4. Beacon Usage-Aware Transmission Technique

Information is added to the beacon frame to indicate to other wireless nodes in the surrounding area about the transmission and reception activity of the node transmitting the beacon.

Two options for sending the directional activity information with the beacon frame are stated below. These option can be performed through broadcasting a directional transmission and reception activity map in all directions, or by sending directional activity bits associated with each beacon transmission.

This activity map can be in the form of an indicator of activity in the specific direction where the beacon is transmitted or inclusive to all directions the node is covering. The collected statistics (transmission, reception, and/or transmission-and-reception (channel usage)) in the specific direction where the beacon is transmitted or inclusive to all directions the node is covering, can also be added to the activity map. In the next sections, the activity map can refer to the simple indication of transmission, reception, or transmission-and-reception and can also refers to the collected statistics (transmission, reception, and/or transmission-and-reception (channel usage)). The activity map can be a collection of all described information as well.

3.4.1. Directional Activity Map Broadcasting

Figure 19A:
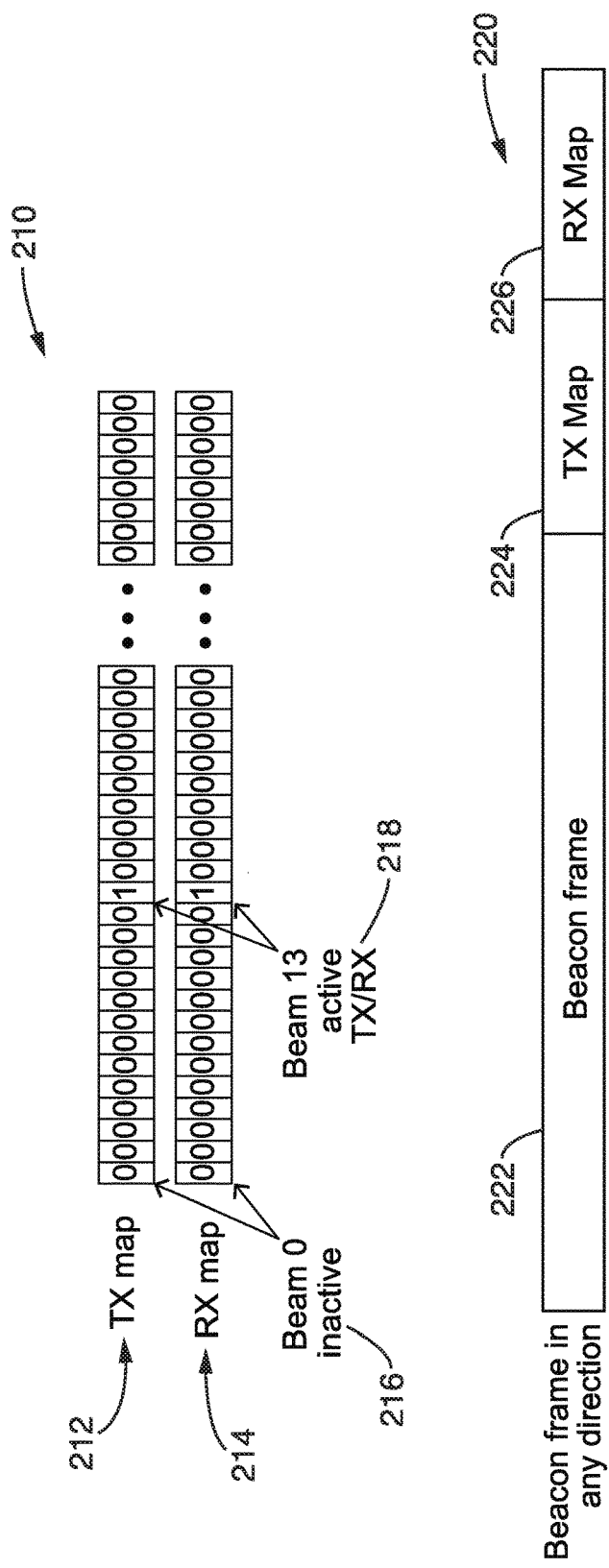
FIG. 19A and FIG. 19B are diagrams of a beacon and associated directional activity map broadcasting according to an embodiment of the present disclosure.
Figure 19B:
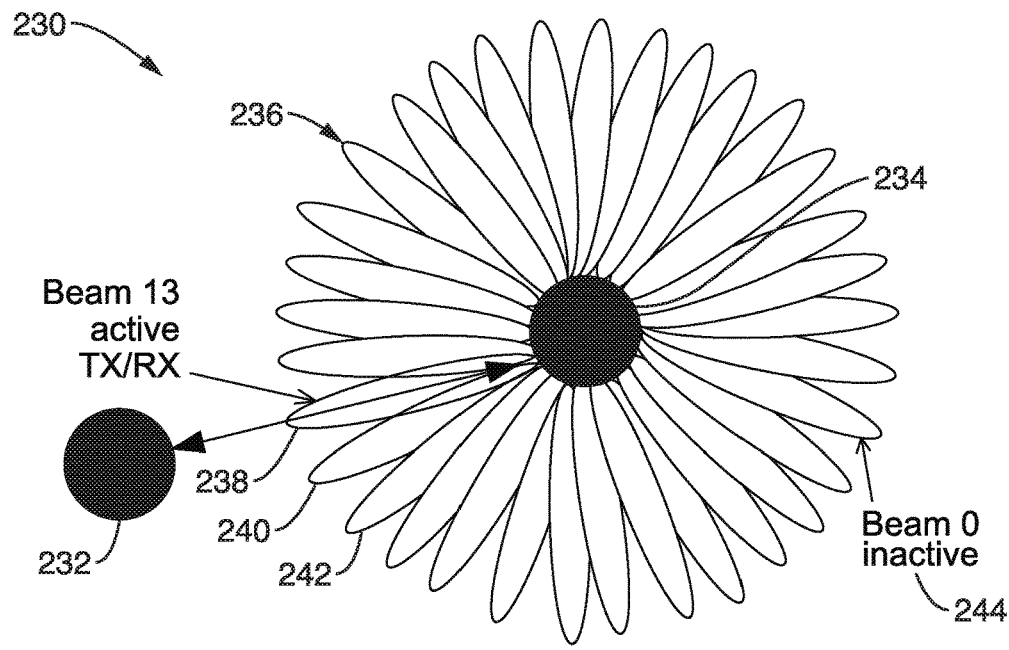

FIG. 19A and FIG. 19B illustrate an example embodiment 210, 220, 230 of directional activity mapping. In FIG. 19A beacons carry a map of the transmitting 212 and receiving 214 beams of that node. In the example shown each field (bit in this case) indicates information for that direction. Using a single flag bit for each, a direction is either active 1, or not active 0 (although the reverse binary states can be utilized). In the maps shown, Beam 0 216 is inactive, along with all the other directions, except for Beam 13 218 which indicates it is active. In the lower portion of FIG. 19A an embodiment 220 is seen with beacon frame 222 having an appended transmit (TX) map 224 and receive (RX) map 226.

This map is broadcasted by all beacons transmitted in all directions. Once a node receives this map, it can compare the beacon transmitting beam ID to the corresponding bit in the map to decide if this direction is in active mode of transmission or reception.

In FIG. 19B, an illustration 230 is seen with a node 234 transmitting beacons from all beams in all directions 236 carrying the TX and RX map. In the example shown node 234 is shown in relation to node 232, which has active transmission and reception through Beam 13 238. The TX and RX activity map of FIG. 19A indicated the activity of Beam 13 by setting the bit associated to it in the TX and RX activity map. All other bits are set to zero since no active transmission or reception is occurring in these directions. It will be noted that any receiver receiving one of these transmitted beacons can find out the beacon transmitting beam ID and the corresponding bit in the map. Nodes can obtain information about other activity in the surrounding area from the transmission and reception of the activity map even if the active direction beacon is not received. In the example, information can be obtained about Beam 12 240, Beam 11 242, or that Beam 0 244 is inactive.

The TX map 212 can carry information more than 1 or zero to indicate multiple levels of occupancy or the exact collected statistic of each direction. The RX map 214 can carry information more than 1 or zero to indicate multiple levels of occupancy or the exact collected statistic of each direction. The TX map and the RX map can be combined to one map if it is required to represent TX/RX map. The TX/RX map can carry information more than 1 or zero to indicate multiple levels of activity or the exact collected statistic of each direction.

3.4.2. Beacon Activity Indicator Bits

As was shown in the example in the upper portion of FIG. 19A, each beacon frame can contain two additional bits for each communication direction to indicate transmission and reception activity. The transmission and reception activity indicators represent the activity in the same direction where the beacon is being transmitted.

Figure 20:
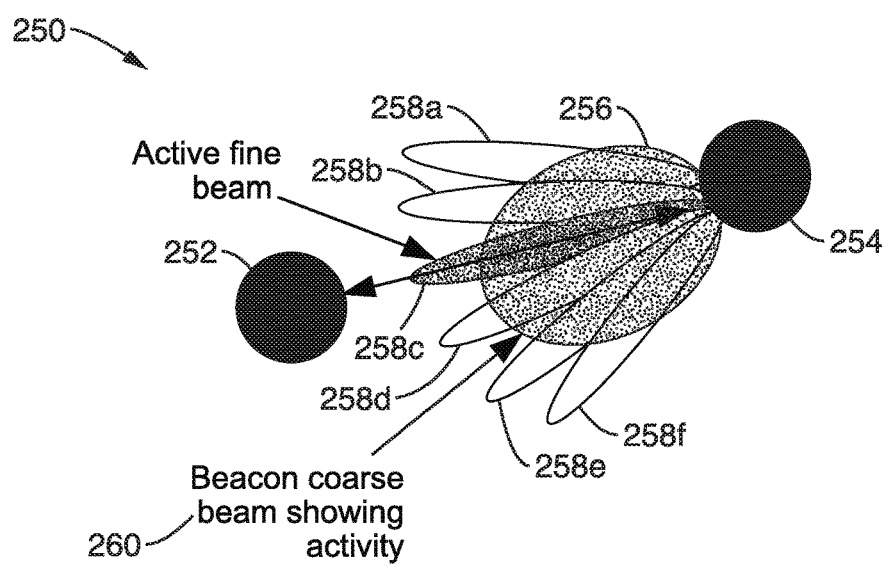
FIG. 20 is a wireless node diagram of directional beacons showing coarse versus fine beams utilized according to an embodiment of the present disclosure.

FIG. 20 illustrates an example embodiment 250 comparing use of coarse data beacons with fine data beacons. It should be appreciated that data might be transmitted with finer beams compared to the beams beacon are transmitted from. That is to say that a beacon transmitted from a coarse beam should indicate transmission from any of the fine beams that lay in its foot print or coverage area. This understanding applies here and to the previous section 3.4.1. A first node 252 is shown in relation to a second node 254 which is shown having fine beams 258a through 258f, with beam 258c being active. A coarse beam 260 is shown in relation to the fine beams, and it is also active. As shown in the figure, if the beacon is transmitted using coarse beams compared to the data transmission or reception beams, the activity indicator in the transmitted beacon represents activity of any of the beams that can be covered by the beacon transmission beam. So the directions indicated by the activity indicators need not have the same resolution as the actual communication directions of the beams. If the direction of the beacon has no activity or the threshold for setting the activity indicator is not met, the beacon directionality activity indicator is reset to zero.

Figure 21A:
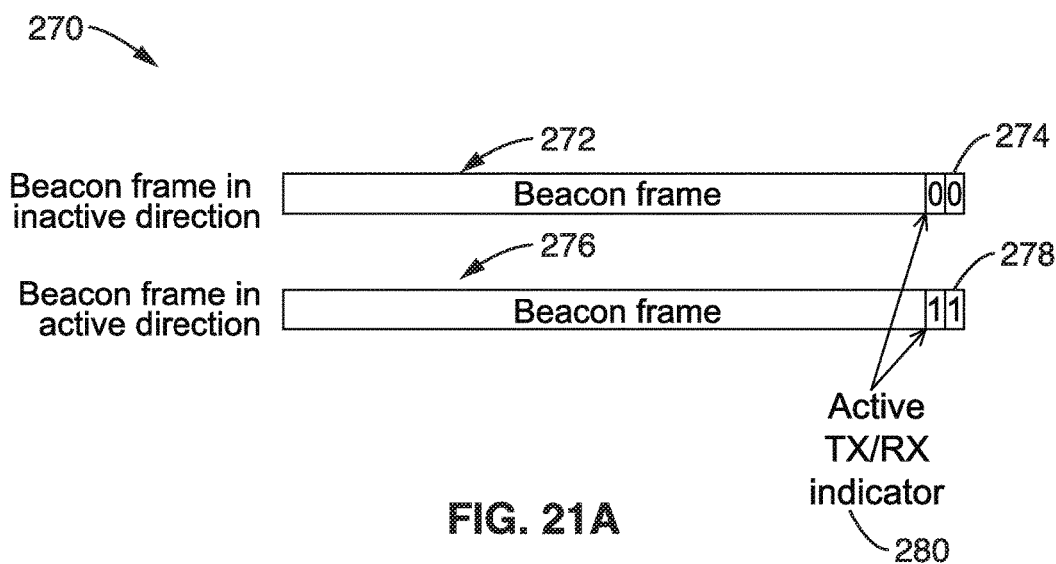
FIG. 21A and FIG. 21B is a diagram of a beacon frame and node diagram of beacon directional activity bits as utilized according to an embodiment of the present disclosure.
Figure 21B:
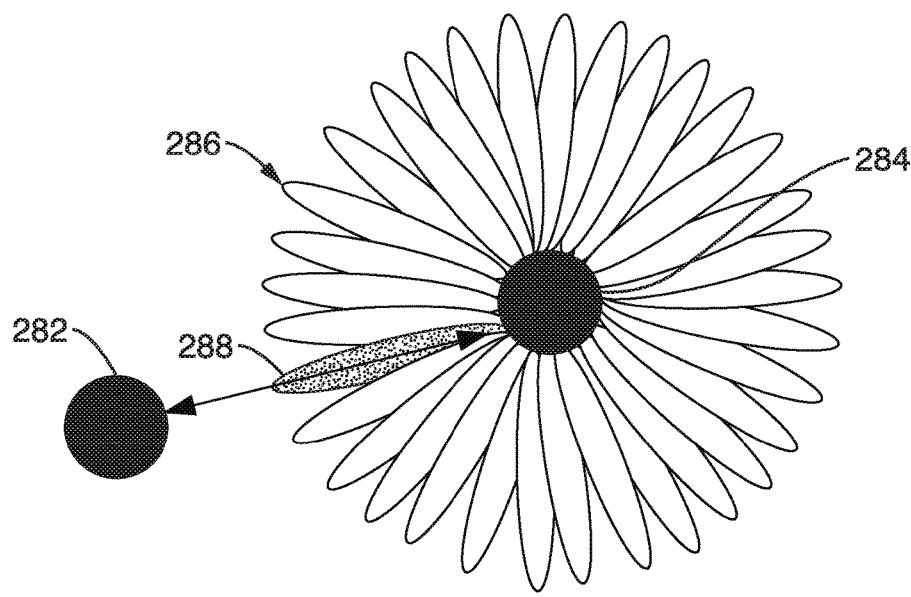

FIG. 21A and FIG. 21B illustrate an example embodiment 270 of setting the activity indicator 280. If the direction of the beacon has some activity and the threshold for setting the activity indicator is met, the beacon directionality activity indicator is set to one. In FIG. 21A a beacon frame 272 is shown for the inactive direction, with bits 274 for TX and RX being set to a state, in this case binary "0" to indicate inactivity, while in beacon frame 276 these TX/RX bits are set to "1" indicating activity.

In FIG. 21B it is seen that node 282 is receiving the beacons from node 284, which is transmitting 286 in all directions. Node 282 receives the beacon from direction 288 of node 284 and can directly determine if that specific direction has ongoing transmission or reception, or not.

The TX activity indicator 274 can carry information of more than 1 or zero to indicate multiple levels of occupancy or the exact collected statistic of each direction. The RX activity indicator 278 can carry information more than 1 or zero to indicate multiple levels of occupancy or the exact collected statistic of each direction. The TX activity indicator and the RX activity indicator can be combined to one activity indicator if it is required to represent TX/RX activity indicator. The TX/RX activity indicator can carry information more than 1 or zero to indicate multiple levels of activity or the exact collected statistic of each direction.

3.5. Example of Beacon Aware Transmission Uses

Knowing information about the directional transmission and reception of the surrounding area around a wireless node can be of great value. The wireless node can use this information to select a better direction for node connectivity or to avoid interfering or being interfered by other nodes in the surrounding area. This information might be a trigger to commence in a coordination process between nodes sharing the same direction for better spectral sharing or directional access management.

It should be noted that although the examples reflect a simple binary activity/non-activity indicator, the present disclosure also contemplates the use of additional bits per direction in certain situations, if more information is desired. For example with 2 bits per direction a level of activity can be conveyed: $00_b$=none, $01_b$=~25%, $10_b$=~50%, and $11_b$>75%.

3.5.1. Physical Link Beam Selection

A node might avoid the best line-of-sight (LOS) beam, for example, with its peer node once other transmission or reception is detected in the direction of the LOS beam of interest. The node once it senses an on-going activity in the direction where its link is of highest power might react to this in a passive or proactive way. The node might decide to avoid the LOS and highest power beam with its peer node for example and look for other alternatives.

Figure 22:
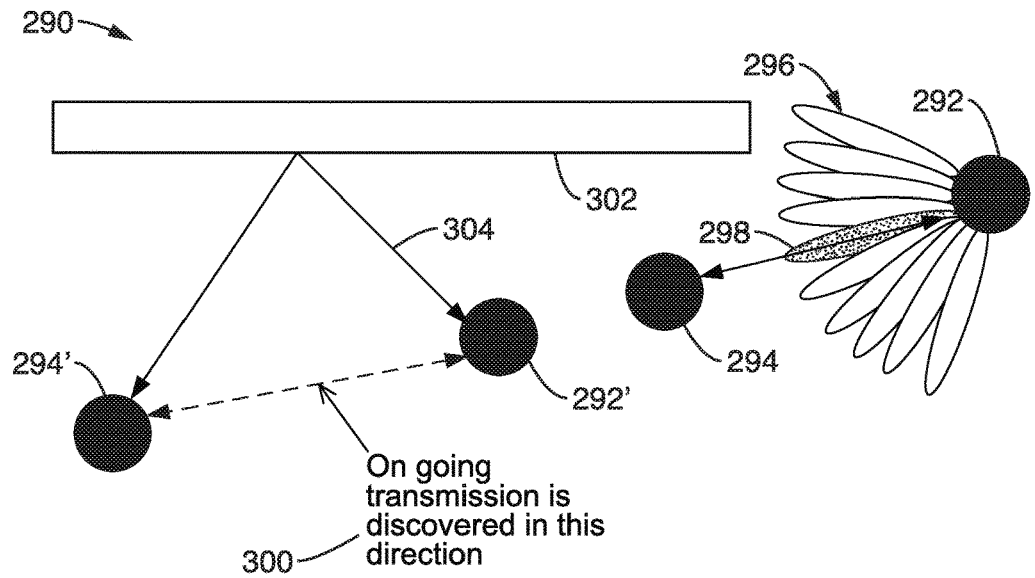
FIG. 22 is a wireless node diagram of a directional beacon activity indicator and beam selection performed according to an embodiment of the present disclosure.

FIG. 22 illustrates an example embodiment 290 comparing LOS with non-line-of-sight (NLOS) beam selection. Shown at the right portion of the figure, in an LOS beam selection, node 294 selects LOS beam direction 298 from node 292 which is transmitting in all directions 296. However, at the left portion of the figure node 294' forms a link with its peer node 292' through a NLOS beam 304 that is reflecting from a nearby wall 302. So although ongoing transmissions may be along path 300 between the nodes, the nodes can select this NLOS direction for this period of time. The node might decide to communicate with the other node where the beacon with activity indicator was discovered. The communication can be through a quick beamforming and requesting channel coordination. The coordination might result in freeing this direction for the requesting node or denying the use of this direction.

3.5.2. Distributed Mesh Network Coordination

Figure 23A:
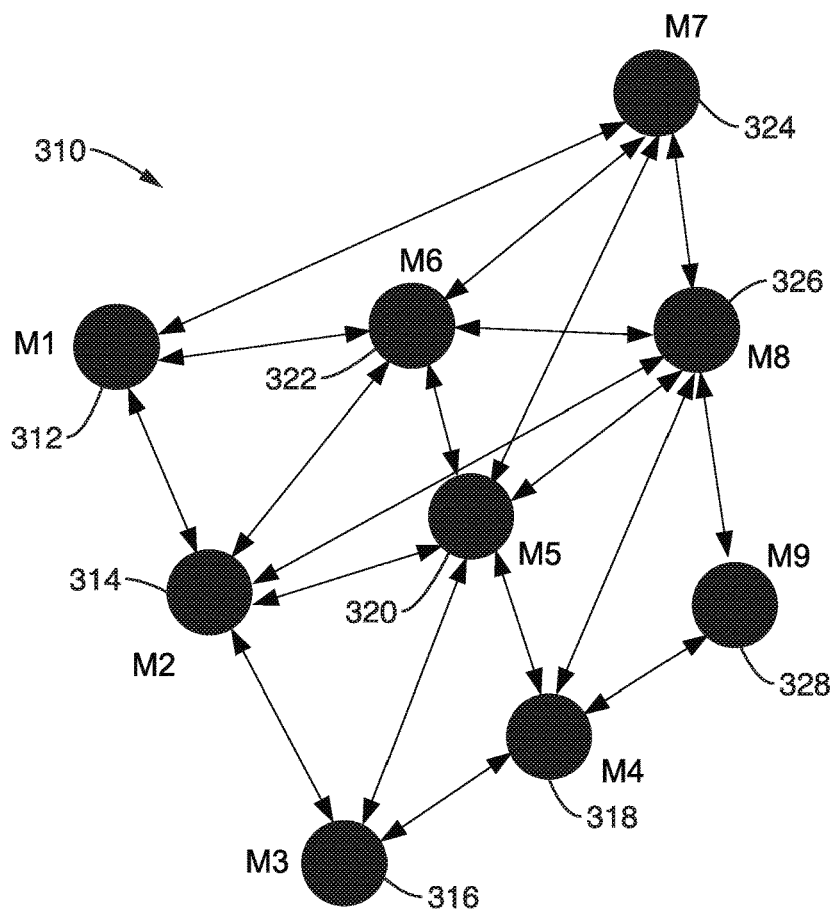
FIG. 23A and FIG. 23B are wireless node diagrams comparing a non-optimized mesh network to directional beacon activity indicator transmission according to an embodiment of the present disclosure.
Figure 23B:
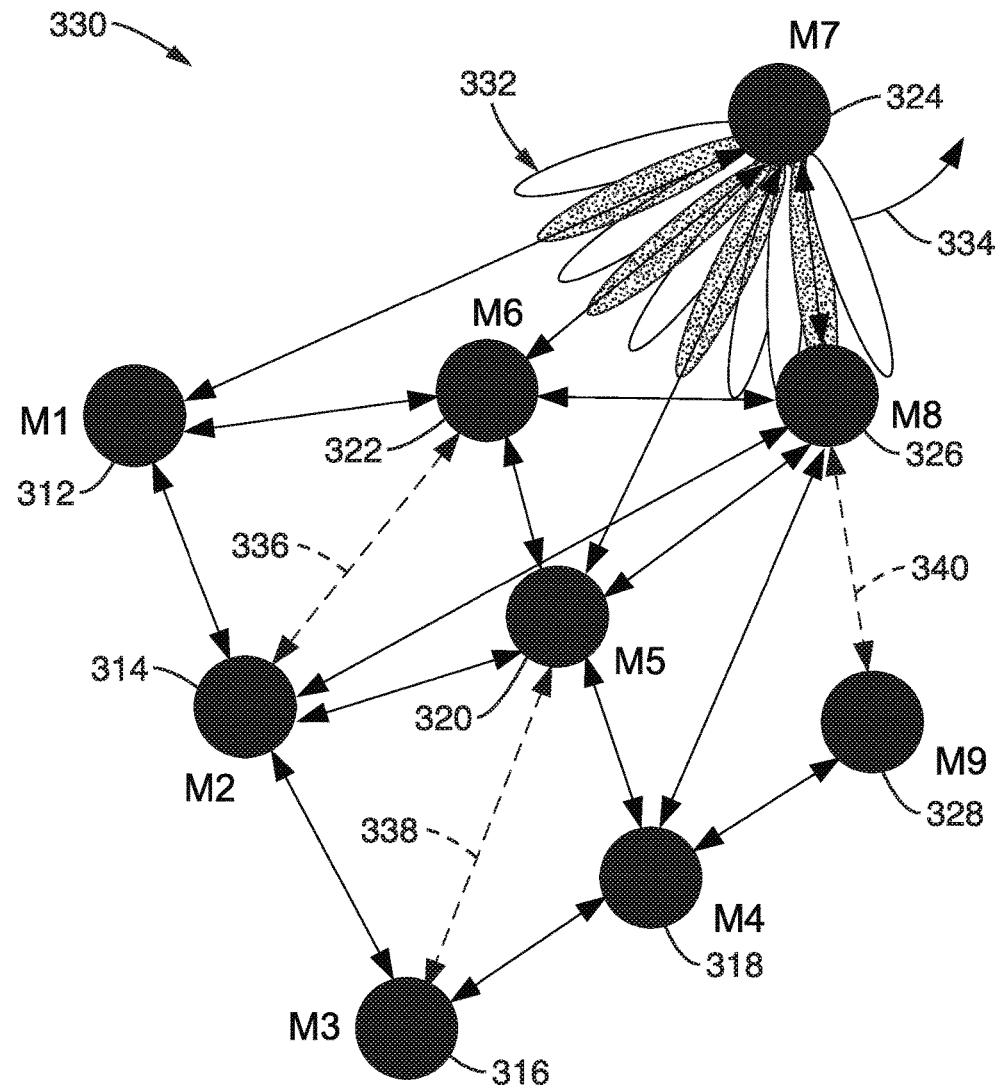

FIG. 23A and FIG. 23B illustrate an example embodiment 310, 330 in comparing an unoptimized mesh network, with one optimized with a directional beam activity indicator. In FIG. 23A a distributed network or mesh scenario is seen in which nodes are forming links to multiple peers in the network. In particular the nodes shown comprise M1 312, M2 314, M3 316, M4 318, M5 320, M6 322, M7 324, M8 326 and M9 328. Links are shown with solid lines showing communication interconnections between nearby stations. However, these highly directive beams and dense deployments are expected to create a lot of interference between stations in the mesh network.

Utilizing the directional beacon activity indicator whose use is shown in FIG. 23B can be of great value to distributedly optimize network connectivity. Nodes can optimize their connectivity upon node setup or introduction in the network or throughout their operation due to the dynamic change of the node location or the environment around it. Nodes are configured to thus avoid forming connectivity with other peer nodes that will result in interfering with ongoing transmission or reception in that direction. Nodes are configured to avoid forming connectivity with other peer nodes that will suffer from interference with ongoing transmission or reception in that direction. Using the directional beacon activity indicator some connections will be optimized or removed to avoid interference. As an example, in FIG. 23B STA M7 324 transmit beacons in all directions 334 and sets the activity indicator in directions of M1 312, M5 320, M6 322 and M8 326. Other nodes in the network, in this example M2 314, M3 316 and M9 328 can detect the beacons from M7 and thus recognize the communication occupancy of these directions. M2, M3 and M9 according to the present disclosure can decide to reroute their data away from these directions or start some spectral sharing coordination procedure, this is why the links 336, 338 and 340 from M2, M3 and M9, respectively, as directed in a direction to/from M7 324 are shown as a dashed line, because a different direction/path may be selected for the communication based on receiving the disclosed activity indicator.

3.5.3. Multiple-Network Coordination

Different WLAN networks and architectures might coexist and share the same spectrum, whereas the present disclosure is applicable to multi-network coordination.

Figure 24:
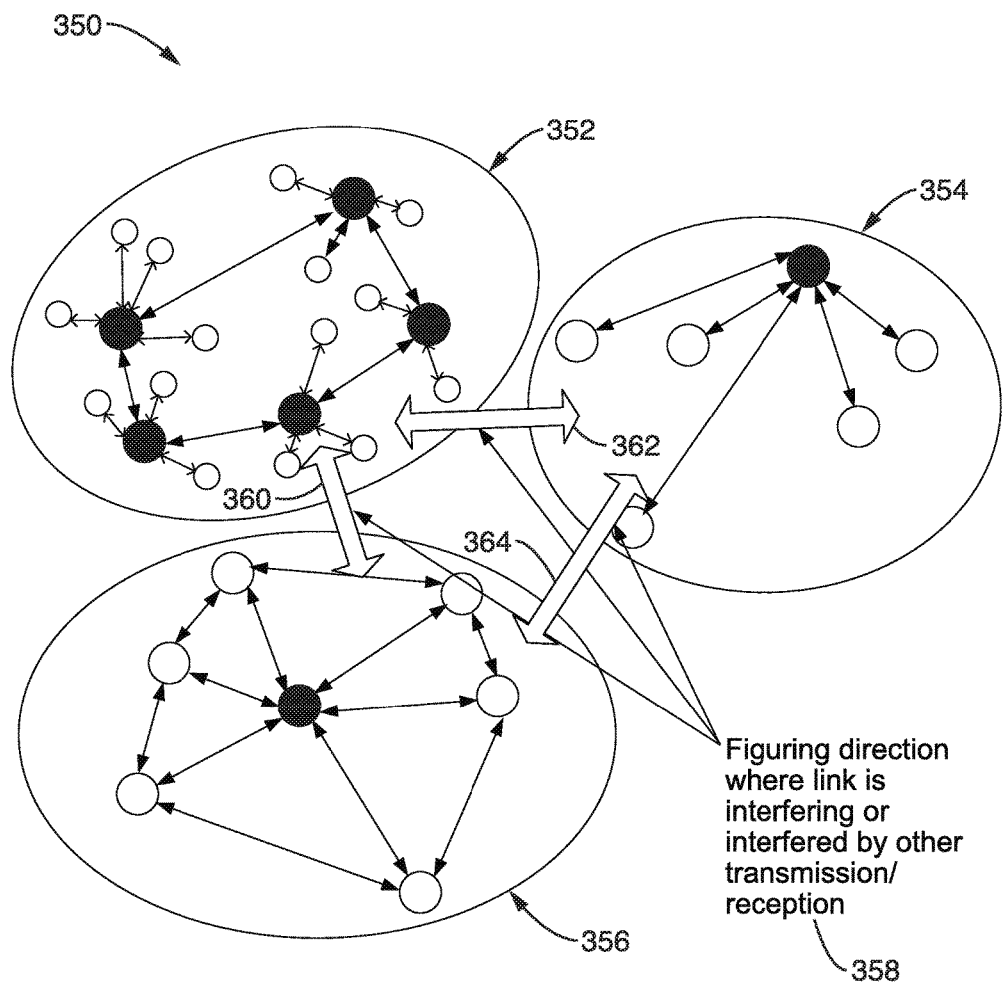
FIG. 24 is a wireless node diagram showing handling of interference between local mesh groups according to an embodiment of the present disclosure.

FIG. 24 illustrates an example embodiment 350 in which three networks 352, 354 and 356 are in close proximity and using the same spectrum. Nodes can "hear" (receive) beacons from other networks and figure out (determine) the direction of activity based on the disclosed activity indicator. In the example shown information 358 is received 360, 362 and 364 between the networks which allow the nodes in the network to determine possible interference and be able to make different direction selections toward optimizing communications within their own network. If a node finds that its direction of communication, or its potential direction of communication, is already occupied by other ongoing transmission through receiving a beacon indicating activity in this direction, the node might consider passive or proactive approaches to remediating the interference. For example, the node might try to search for other directions to/from a link with its intended peer node or reroute its data through other nodes. The node can be configured to commence a coordination procedure with the other nodes where the directional beacon with activity indicator was received.

3.6. Coordination Announcement Through Quick Beamforming

Once a node discovers on-going activity in the direction of interest to this node it might decide to reach out to this node. Although this node might not be part of the network of the node where the beacon with activity indication has been received, the node might decide to tell the other nodes about its existence. An exchange of beamforming frames (SSW or BRP frames) can be performed to beamform with the new node. The exchanged beamforming frames can include an indication field (e.g., one bit) to indicate that the purpose of communication is coordination not joining the network. The coordination can comprise any type of spectral sharing, or rerouting data of one of the links to other routes.

3.7. Multiple-Band Operation

If the wireless device is equipped with multi-band operation (mmW band and sub-6 GHz band for example), the node can send the mmW band spectral usage information over the sub-6 GHz band in situations where interference is likely to arise. A directional activity map like the one defined in 3.4.1. can be transmitted over the sub-6 GHz map to indicate the directional spectral usage on the mmW band. This information can be broadcasted with the sub-6 GHz beacon with an indication that this is related to other bands and channel and indicating the band and channel of concern. The mmW directional spectral usage can also be requested over sub-6 GHz communication and the node receiving this request can respond by a directional activity map for the band and channel requested.

3.8. New Frame Format

3.8.1. Beacon Frame w/Directional Activity Indicator—Broadcast Mode

This is a frame that is similar to the regular 802.11 DMG beacons frames but has some elements to allow some extra features. These frames are transmitted by an AP, STA or mesh AP node in all directions. This frame is contains specific details for new nodes, current nodes in the network and nodes outside the transmitter network to indicate current transmission and reception in the directions the node is transmitting beacons. Each beacon transmits the same information about the directional transmission map of all supported directions. The beacon frame of should contain this information in addition to the typical information in the regular beacon frame.

The beacon frame with directional activity indicator in broadcast mode is a beacon frame which also comprises the following fields.

Directional transmission activity indication map: N×q bits, in which "N" is the number of directions that beacons are transmitted in and q is the number of bits to represent the activity in one direction. Each beacon transmitted contains a directional transmission activity map of all directions supported.

Directional reception activity indication map: N×q bits where N is the number of directions that beacons are received from and q is the number of bits to represent the activity in one direction. Each beacon Received contains a directional reception activity map of all directions supported.

3.8.2. Beacon Frame w/Directional Activity Indicator—Bit Indicator Mode

This is a frame that is similar to the regular 802.11 DMG beacons frames but has some elements to allow some extra features. These frames are transmitted by an AP or mesh AP node in all directions. This frame contains specific details for new nodes, current nodes in the network and nodes outside the transmitter network to indicate current transmission and reception in the directions the node is transmitting beacons. Each beacon transmits unique information about the activity of transmission and reception in the direction it is covering. The beacon frame contain this information in addition to the typical information in the regular beacon frame. The beacon frame with directional activity indicator in bit indicator mode is a beacon frame which also comprises the following fields.

Beacon direction transmission activity indicator: q bits to indicate if there is a data transmission activity in the same direction the beacon is being transmitted. The data transmission activity can be represented by 1 bit or more depending on the required resolution to be indicated.

Beacon direction reception activity indicator: q bits to indicate if there is a data reception activity in the same direction the beacon is being transmitted. The data reception activity can be represented by 1 bit or more depending on the required resolution to be indicated.

3.8.3. SSW/BRP Frames

This is a frame that is similar to the regular 802.11 SWW or BRP frames used for beam forming. These frames are sent by the STA in response to receiving a beacon from a node with transmission or reception activity indication. The frame contains information to indicate the existence of a new node trying to use the same direction of the received beacon and requesting coordination. The beacon frame of contain this information in addition to the typical information in the regular beacon frame.

The SSW/BRP frames additionally can comprise the following field.

Coordination request: 1-bit to inform the node of possible interference in that direction and request coordination if possible.

Directional transmission activity indication map: N×q bits, in which "N" is the number of directions that frame are transmitted in and q is the number of bits to represent the activity in one direction. Each frame transmitted contains a directional transmission activity map of all directions supported.

Directional reception activity indication map: N×q bits where N is the number of directions that frame are received from and q is the number of bits to represent the activity in one direction. Each frame Received contains a directional reception activity map of all directions supported.

Direction transmission activity indicator: q bits to indicate if there is a data transmission activity in the same direction the frame is being transmitted. The data transmission activity can be represented by 1 bit or more depending on the required resolution to be indicated.

Directional reception activity indicator: q bits to indicate if there is a data reception activity in the same direction the frame is being transmitted. The data reception activity can be represented by 1 bit or more depending on the required resolution to be indicated.

4. Summary of Disclosure Elements

The following is a partial summary of aspects associated with the present disclosure.

Beacons are sent with an indication of directions with active data transmission. The indication can be a flag that represents whether the beacon direction is occupied with active transmission/reception or not. The indication can be a broadcast of a map of the transmission activity in all directions.

Stations and new nodes in the network can use this direction information to select a better through connection, for example to decide on which AP/STA/MSTA to connect to, and/or to decide on which beam from the same AP/STA/MSTA to connect to.

Stations and new nodes in the network can use this direction information to initiate a distributed interference and resource coordination by exchanging messages in the direction of potential high interference.

Stations and new nodes in the network can use this direction information to reroute data through other nodes/beams whenever there are alternative routes which are less spectrally congested, or that are suffering from lowered levels of interference.

5. General Scope of Embodiments

The enhancements described in the presented technology can be readily implemented within various wireless (e.g., mmWave) transmitters, receivers and transceivers. It should also be appreciated that modern wireless transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern wireless communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a mesh network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) transmitting frames in all, or select directions, to other nodes in the network for broadcasting network information, beamforming or other purpose; and (d)(ii) incorporating an activity indicator into the transmitted frames, wherein said activity indicator provides an indication of which communication directions have active data activity in transmission, reception or transmission and/or receptions.

2. The apparatus of any preceding or following embodiment, wherein said activity indicator comprises a one or more bits representing whether the frame direction is occupied with active transmission and/or receptions, or is not occupied.

3. The apparatus of any preceding or following embodiment, wherein said instructions when executed by the processor further perform steps comprising broadcasting said activity indicator as a map of activity for each direction that a node is configured to communicate in.

4. The apparatus of any preceding or following embodiment, wherein said instructions when executed by the processor further perform steps comprising utilizing information from said activity indicator for selecting a connection that is subject to less interference, or that will create less interference to other stations in the mesh network.

5. The apparatus of any preceding or following embodiment, wherein said instructions when executed by the processor further perform steps comprising performing said selecting of a connection by deciding on which access point (AP) or station (STA) or mesh station (MSTA) to connect to.

6. The apparatus of any preceding or following embodiment, wherein said instructions when executed by the processor further perform steps comprising performing said selecting of a connection by deciding on which beam from the same access point (AP) or station (STA) or mesh station (MSTA) to connect to.

7. The apparatus of any preceding or following embodiment, wherein said instructions when executed by the processor further perform steps comprising utilizing information from said activity indicator in initiating a distributed interference and resource coordination by exchanging messages in a direction of potential high interference to optimize overall communications and create less interference between nodes in the mesh network.

8. The apparatus of any preceding or following embodiment, wherein said instructions when executed by the processor further perform steps comprising utilizing information from said activity indicator in rerouting data through other nodes or communication beams whenever alternative communication routes exist which are less spectrally congested or that are subject to less interference.

9. The apparatus of any preceding or following embodiment, wherein said activity indicator is utilized to signal which communication directions on a directional millimeter-wave (mmW) communication protocol have active data transmissions.

10. The apparatus of any preceding or following embodiment, wherein said wireless communication circuit is further configured for wirelessly communicating with other wireless communication stations utilizing sub-6 GHz wireless communication, and communicating said directional indicator for the mmW directions over the sub-6 GHz wireless communication.

11. An apparatus for wireless communication in a mesh network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) transmitting frames in all, or select directions, to other nodes in the network for broadcasting network information, beamforming or other purposes; (d)(ii) incorporating an activity indicator, comprising one or more bits per direction, into the transmitted frames, wherein said activity indicator provides an indication of which communication directions have active data activity in transmission, reception or transmission and/or receptions; and (d)(iii) broadcasting said activity indicator as a map of activity for each direction that a node is configured to communicate in.

12. The apparatus of any preceding or following embodiment, wherein said instructions when executed by the processor further perform steps comprising utilizing information from said activity indicator for selecting a connection that is subject to less interference, or that will create less interference to other stations in the mesh network.

13. The apparatus of any preceding or following embodiment, wherein said instructions when executed by the processor further perform steps comprising performing said selecting of a connection by deciding on which access point (AP) or station (STA) or mesh station (MSTA) to connect to.

14. The apparatus of any preceding or following embodiment, wherein said instructions when executed by the processor further perform steps comprising performing said selecting of a connection by deciding on which beam from the same access point (AP) or station (STA) or mesh station (MSTA) to connect to.

15. The apparatus of any preceding or following embodiment, wherein said instructions when executed by the processor further perform steps comprising utilizing information from said activity indicator in initiating a distributed interference and resource coordination by exchanging messages in a direction of potential high interference to optimize overall communications and create less interference between nodes in the mesh network.

16. The apparatus of any preceding or following embodiment, wherein said instructions when executed by the processor further perform steps comprising utilizing information from said activity indicator in rerouting data through other nodes or communication beams whenever alternative communication routes exist which are less spectrally congested or that are subject to less interference.

17. The apparatus of any preceding or following embodiment, wherein said activity indicator is utilized to signal which communication directions on a directional millimeter-wave (mmW) communication protocol have active data transmissions.

18. The apparatus of any preceding or following embodiment, wherein said wireless communication circuit is further configured for wirelessly communicating with other wireless communication stations utilizing sub-6 GHz wireless communication, and communicating said directional indicator for the mmW directions over the sub-6 GHz wireless communication.

19. A method of performing wireless communication in a mesh network, comprising: (a) transmitting frames, from a wireless communication circuit configured for wirelessly communicating with other wireless communication stations, utilizing directional millimeter-wave (mmW) communications having a plurality of antenna pattern sectors each having different transmission directions, in all or some directions to other nodes in the network for broadcasting network information, beamforming or other purposes; and (b) incorporating an activity indicator into the transmitted frames, wherein said activity indicator provides an indication of which communication directions have active data activity in transmission, reception or transmission and/or receptions.

20. The method of any preceding embodiment, wherein said activity indicator is broadcast as a map of activity for each direction that a node is configured to communicate in.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a mesh network, comprising:
    (a) a wireless communication circuit configured for wirelessly communicating with other wireless communication stations utilizing directional millimeter-wave (mmW) communications having a plurality of antenna pattern sectors each having different transmission directions;
    (b) a processor coupled to said wireless communication circuit within a station configured for operating on the mesh network;
    (c) a non-transitory memory storing instructions executable by the processor; and
    (d) wherein said instructions, when executed by the processor, perform steps comprising:
        (i) transmitting frames in all, or select directions, to other nodes in the network for broadcasting network information, beamforming or other purpose; and
        (ii) incorporating an activity indicator into the transmitted frames, wherein said activity indicator provides an indication of which communication directions have active data activity in transmission, reception or transmission and/or receptions.

2. The apparatus as recited in claim 1, wherein said activity indicator comprises a one or more bits representing whether the frame direction is occupied with active transmission and/or receptions, or is not occupied.

3. The apparatus as recited in claim 1, wherein said instructions when executed by the processor further perform steps comprising broadcasting said activity indicator as a map of activity for each direction that a node is configured to communicate in.

4. The apparatus as recited in claim 1, wherein said instructions when executed by the processor further perform steps comprising utilizing information from said activity indicator for selecting a connection that is subject to less interference, or that will induce less interference to other stations in the mesh network.

5. The apparatus as recited in claim 4, wherein said instructions when executed by the processor further perform steps comprising performing said selecting of a connection by deciding on which access point (AP) or station (STA) or mesh station (MSTA) to connect to.

6. The apparatus as recited in claim 4, wherein said instructions when executed by the processor further perform steps comprising performing said selecting of a connection by deciding on which beam from the same access point (AP) or station (STA) or mesh station (MSTA) to connect to.

7. The apparatus as recited in claim 1, wherein said instructions when executed by the processor further perform steps comprising utilizing information from said activity indicator in initiating a distributed interference and resource coordination by exchanging messages in a direction of potential high interference to optimize overall communications and create less interference between nodes in the mesh network.

8. The apparatus as recited in claim 1, wherein said instructions when executed by the processor further perform steps comprising utilizing information from said activity indicator in rerouting data through other nodes or communication beams whenever alternative communication routes exist which are less spectrally congested or that are subject to less interference.

9. The apparatus as recited in claim 1, wherein said activity indicator is utilized to signal which communication directions on a directional millimeter-wave (mmW) communication protocol have active data transmissions.

10. The apparatus as recited in claim 9, wherein said wireless communication circuit is further configured for wirelessly communicating with other wireless communication stations utilizing sub-6 GHz wireless communication, and communicating said directional indicator for the mmW directions over the sub-6 GHz wireless communication.

11. An apparatus for wireless communication in a mesh network, comprising:
(a) a wireless communication circuit configured for wirelessly communicating with other wireless communication stations utilizing directional millimeter-wave (mmW) communications having a plurality of antenna pattern sectors each having different transmission directions;
(b) a processor coupled to said wireless communication circuit within a station configured for operating on the mesh network;
(c) a non-transitory memory storing instructions executable by the processor; and
(d) wherein said instructions, when executed by the processor, perform steps comprising:
  (i) transmitting frames in all, or select directions, to other nodes in the network for broadcasting network information, beamforming or other purposes;
  (ii) incorporating an activity indicator, comprising one or more bits per direction, into the transmitted frames, wherein said activity indicator provides an indication of which communication directions have active data activity in transmission, reception or transmission and/or receptions; and
  (iii) broadcasting said activity indicator as a map of activity for each direction that a node is configured to communicate in.

12. The apparatus as recited in claim 11, wherein said instructions when executed by the processor further perform steps comprising utilizing information from said activity indicator for selecting a connection that is subject to less interference, or that will create less interference to other stations in the mesh network.

13. The apparatus as recited in claim 12, wherein said instructions when executed by the processor further perform steps comprising performing said selecting of a connection by deciding on which access point (AP) or station (STA) or mesh station (MSTA) to connect to.

14. The apparatus as recited in claim 12, wherein said instructions when executed by the processor further perform steps comprising performing said selecting of a connection by deciding on which beam from the same access point (AP) or station (STA) or mesh station (MSTA) to connect to.

15. The apparatus as recited in claim 11, wherein said instructions when executed by the processor further perform steps comprising utilizing information from said activity indicator in initiating a distributed interference and resource coordination by exchanging messages in a direction of potential high interference to optimize overall communications and create less interference between nodes in the mesh network.

16. The apparatus as recited in claim 11, wherein said instructions when executed by the processor further perform steps comprising utilizing information from said activity indicator in rerouting data through other nodes or communication beams whenever alternative communication routes exist which are less spectrally congested or that are subject to less interference.

17. The apparatus as recited in claim 11, wherein said activity indicator is utilized to signal which communication directions on a directional millimeter-wave (mmW) communication protocol have active data transmissions.

18. The apparatus as recited in claim 17, wherein said wireless communication circuit is further configured for wirelessly communicating with other wireless communication stations utilizing sub-6 GHz wireless communication, and communicating said directional indicator for the mmW directions over the sub-6 GHz wireless communication.

19. A method of performing wireless communication in a mesh network, comprising:
(a) transmitting frames, from a wireless communication circuit configured for wirelessly communicating with other wireless communication stations, utilizing directional millimeter-wave (mmW) communications having a plurality of antenna pattern sectors each having different transmission directions, in all or some directions to other nodes in the network for broadcasting network information, beamforming or other purposes; and
(b) incorporating an activity indicator into the transmitted frames, wherein said activity indicator provides an indication of which communication directions have active data activity in transmission, reception or transmission and/or receptions.

20. The method as recited in claim 19, wherein said activity indicator is broadcast as a map of activity for each direction that a node is configured to communicate in.

* * * * *